(12) United States Patent
Hartnett

(10) Patent No.: US 11,960,710 B1
(45) Date of Patent: Apr. 16, 2024

(54) DYNAMIC GRAPHICAL USER INTERFACE GENERATION AND UPDATE BASED ON INTELLIGENT NETWORK COMMUNICATIONS

(71) Applicant: U.S. Army DEVCOM, Army Research Laboratory, Adelphi, MD (US)

(72) Inventor: Regina A. Hartnett, Enterprise, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/987,335

(22) Filed: Nov. 15, 2022

(51) Int. Cl.
*G06F 3/048* (2013.01)
*G06F 3/0484* (2022.01)

(52) U.S. Cl.
CPC .................. *G06F 3/0484* (2013.01)

(58) Field of Classification Search
CPC ...................................... G06F 3/0484
See application file for complete search history.

(56) References Cited

U.S. PATENT DOCUMENTS

| | | | | |
|---|---|---|---|---|
| 6,963,425 B1* | 11/2005 | Nair | .......................... | G06T 7/90 358/1.9 |
| 9,459,776 B1* | 10/2016 | Miller | .................. | G06F 3/04886 |
| 10,410,134 B1* | 9/2019 | Cozby | ....................... | G06N 3/08 |
| 10,687,765 B1* | 6/2020 | Benaroya | .............. | G06F 3/0481 |
| 2016/0034158 A1* | 2/2016 | Livesay | ........... | G05B 19/41835 715/736 |
| 2019/0220922 A1* | 7/2019 | Barkas | .................... | G06Q 40/12 |
| 2021/0028938 A1* | 1/2021 | Suwald | .............. | G06V 40/1365 |
| 2021/0192412 A1* | 6/2021 | Krishnaswamy | .. | G06Q 30/0201 |
| 2022/0080210 A1* | 3/2022 | Cao | ......................... | G16H 20/40 |
| 2022/0222047 A1* | 7/2022 | Todirel | ................ | G06F 11/3608 |
| 2022/0405775 A1* | 12/2022 | Siebel | ................ | G06Q 30/0202 |

* cited by examiner

*Primary Examiner* — David E Choi
(74) *Attorney, Agent, or Firm* — Emily C. Moscati

(57) ABSTRACT

Ways to provide information via dynamic user interfaces including Dynamic InfoGraphics (DIG) are described. DIG representations may include various elements, such as text, icons and other graphics, tags, links, etc. and may be implemented via various types of displays or operating environments. Users may include, for example, pilots, soldiers, commanders, drivers, game players, etc. Information provided via DIG may include, for instance, data received from various types of sensors, communications received from other parties or resources, calculated or otherwise determined information (e.g., predictions associated with artificial intelligence (AI) resources such as autonomous or semi-autonomous intelligent agents), and/or other appropriate information (e.g., user inputs). The received information may be applied to one or more DIG representations or templates. AI features may be used to predict future actions, paths, goals or targets, etc. The DIG representation(s) may be updated as updated sensor information is received and/or predictions are generated.

20 Claims, 23 Drawing Sheets

800

MEDEVAC PROCEDURES
Practical Exercise 1

DUST OFF
A TEAM

Line 1: PK 15644587 (BREAK)

Line 2: A Team (BREAK)

Line 3: 1 A (BREAK), 1 B (BREAK)

Line 4: 1 D (BREAK)

Line 5: 1 L (BREAK), 1 A (BREAK)

Line 6: 1 heart attack (BREAK)

Line 7: A (BREAK)

Line 8: 1 A (BREAK), 1 B (BREAK)

Line 9: Large Open Field

+ 9 Line MEDEVAC +

Line 1 - Location

Line 2 - Radio Freq/Call Sign

Line 3 - # of Patients by Precedence
  A - Urgent    B - Urgent Surgical
  C - Priority   D - Routine   E - Convenience Line 4 - Special Equip Required
  A - None   B - Hoist   C - Extraction Equip
  D - Ventilation Line 5 - Number of Patients
  A - Litter   B - Ambulatory Line 6 - Security at Pickup Site
  N - No Enemy Troops in Area
  P - Possible Enemy Troops (Caution)
  E - Enemy Troops in Area (Caution)
  X - Enemy Troops in Area (Escort)

Line 7 - Method of Marking Pickup Site
  A - Panels   B – Pyrotechnical Signal
  C - Smoke Signal  D - None  E - Other Line 8 - Patient Nationality & Status
  A - US Mil   B - US Civ   C - Non-US Mil
  D - Non-US Civ   E - EPW Line 9 – NBC Contamination
  N - Nuclear   B - Biological   C - Chemical

*FIG. 9*

Level 1: What

Level 2: What & Why

*1200*

Level 3: What, Why, & Next

Why
  Action: Red Security
  Top Factor: Enemy SPOT report

Next
  Prediction/Advice/Decision/Suggestion (PADS): Change to Green, ETA 90 Sec.
  Top Factor: FARA Gunships Attack Inbound

*1210*

US 11,960,710 B1

DYNAMIC GRAPHICAL USER INTERFACE GENERATION AND UPDATE BASED ON INTELLIGENT NETWORK COMMUNICATIONS

GOVERNMENT INTEREST

The invention described herein may be manufactured, used and licensed by or for the U.S. Government.

FIELD OF THE INVENTION

This invention relates to dynamic user interface (UI) features.

BACKGROUND OF THE INVENTION

Many users, such as pilots or soldiers, may receive information from various sources.

Therefore there exists a need for ways to convey the received information to the users.

BRIEF SUMMARY OF THE INVENTION

Broadly, some embodiments generally provide ways to provide information via dynamic user interfaces including Dynamic InfoGraphics (DIG). DIG representations may include various elements, such as text, icons and other graphics, tags, links, etc. and may be implemented via various types of displays or operating environments (e.g., a monitor, a display associated with vehicle hardware such as a visor or windshield, a heads-up display associated with wearable hardware such as a helmet or eyewear, hardware associated with a virtual reality (VR) or augmented reality (AR) environment, etc.). Users may include, for example, pilots, soldiers, commanders, drivers, game players, etc.

During operation, information may be collected by a DIG manager of some embodiments. Such information may include, for instance, data received from various types of sensors, communications received from other parties or resources, calculated or otherwise determined information (e.g., predictions associated with artificial intelligence (AI) resources such as autonomous or semi-autonomous intelligent agents), and/or other appropriate information (e.g., user inputs). The received information may be filtered or processed in various ways before applying the information to one or more DIG representations or templates.

Each DIG representation may include elements such as a footprint, a set of components (e.g., text, graphics, etc.), layout information for the set of components, and/or other appropriate information (e.g., listings of input data types and/or other input information). Data may be applied to the DIG representation in various appropriate ways, depending on the type of data. For instance, text-based information such as a label may receive a text string and display the text string via a label element. As another example, a measured value, such as temperature, may be manipulated to match a display element type associated with the DIG representation (e.g., a three-digit numerical display for Fahrenheit temperature) and presented via the display element. As still another example, received information may be mapped to discrete values or representations (e.g., if a sensor reading is outside a specified range, a "warning" icon may be displayed, whereas if all sensor readings are within specified ranges, an "OK" icon may be displayed).

Information provided via DIG may be updated as updated information is received, such that a user is aware of current conditions and/or any currently-available plan or prediction information. Some embodiments of the DIG manager may utilize AI features to predict future actions, paths, goals or targets, etc.

Each DIG may provide tiers of information related to "what" (e.g., current readings or plan information), "why" (e.g., decision aids to help pilots understand predicted actions), and "next prediction" (e.g., a predicted path or next destination that is based on the decision aids). Such transparency, especially as related to predictions or suggestions provided by intelligent agents, increases trust and makes users more likely to follow the suggestions and/or adhere to a mission plan or similar objectives. Various example DIGs and example tiers of information will be described in more detail below.

BRIEF DESCRIPTION OF THE DRAWINGS

The novel features of the disclosure are set forth in the appended claims. However, for purpose of explanation, several embodiments are illustrated in the following drawings.

FIG. 8 illustrates an example communication of one or more embodiments described herein, in which medical evacuation information is provided via a nine-line display;

FIG. 9 illustrates an example mapping of one or more embodiments described herein, in which medical evacuation information is converted to a nine-line format;

DETAILED DESCRIPTION OF THE INVENTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features.

Figure 1:
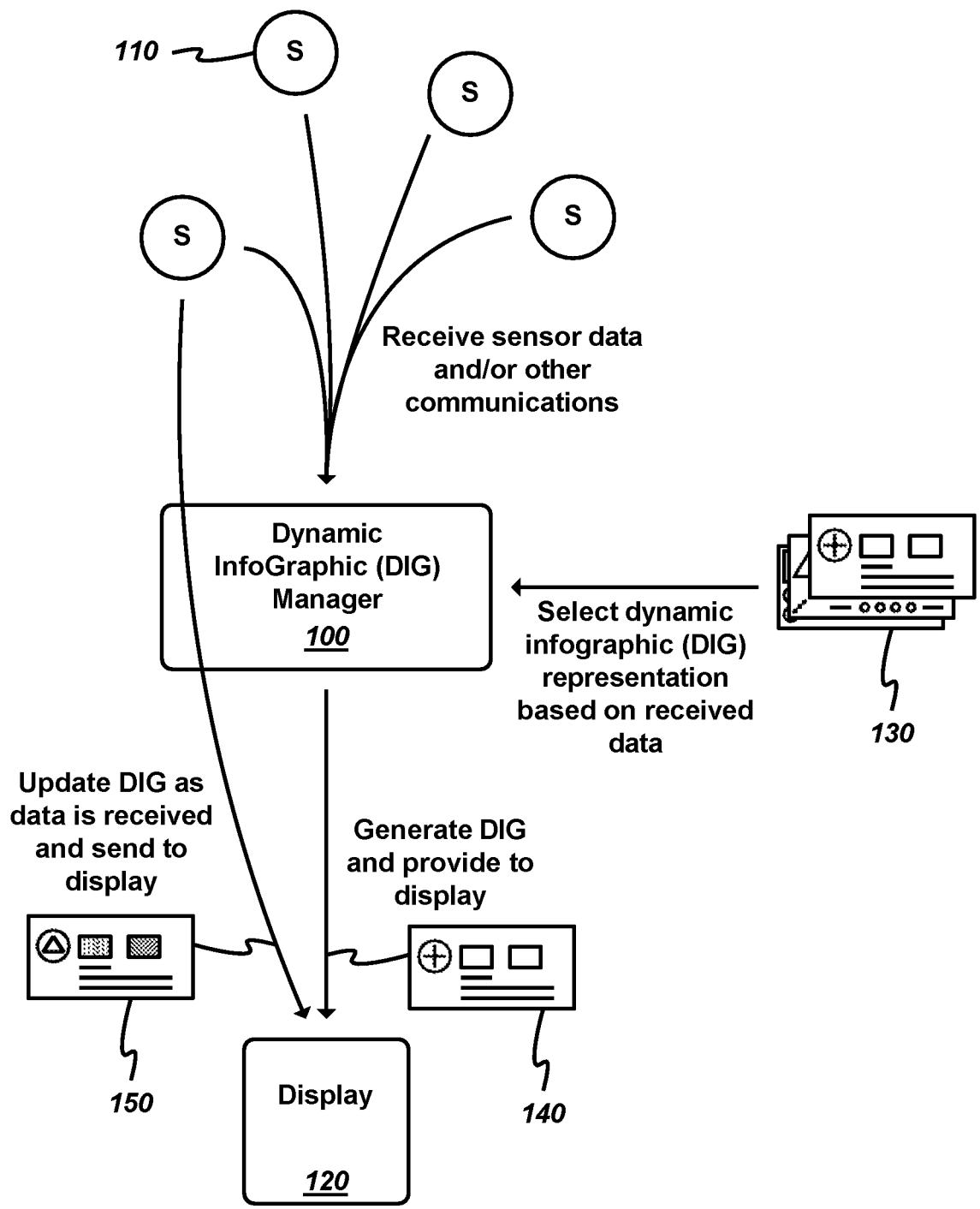
FIG. 1 illustrates an example overview of one or more embodiments described herein, in which a dynamic infographics (DIG) manager selects a DIG representation and provides relevant information via the DIG.

FIG. 1 illustrates an example overview of one or more embodiments described herein, in which a dynamic infographics (DIG) manager 100 selects a DIG representation and provides relevant information via the DIG. DIGs may allow complex and voluminous sets of information to be presented clearly and accurately without impeding the ability of a user to interact with the environment or equipment. For example, weather information may be provided to a pilot via a DIG located in an upper left corner of a heads-up display utilized by the pilot. The pilot may be able to quickly and easily evaluate current weather conditions (e.g., temperature, humidity, wind, precipitation, etc.), predicted weather conditions, weather conditions associated with a path or destination, etc. via the DIG without diverting attention from the flight controls or outside environment.

DIG manager 100 may be, include, and/or utilize, a set of one or more electronic devices that are capable of communicating across various channels, processing instructions and/or data, and/or at least partially directing operations of other components, devices, or systems. For example, DIG manager 100 may be implemented via a network-accessible server. As another example, DIG manager 100 may be implemented via a vehicle head unit or similar device(s). As another example, DIG manager 100 may be implemented via a wearable device or component such as a helmet or smart glasses.

As shown, DIG manager 100 may receive sensor data and/or other communications from sensors 110. Such data may be received across various communication paths or channels, such as local channels (e.g., wired or wireless connections to sensors associated with a vehicle or user), network channels (e.g., cellular networks, Wi-Fi networks, peer-to-peer networks, the Internet, etc.), radio channels, optical channels, etc. Each sensor 110 may provide information such as measured or calculated data (e.g., temperature, wind speed, sensor location, heart rate, etc.), communications from other parties (e.g., a radio message indicating a destination or goal, global positioning system (GPS) information received via satellite communication, etc.), and/or other types of data or messages (e.g., live audio or text communications among a related group of users). Sensors 110 may include Internet of battlefield things (IoBT) devices. Throughout this disclosure, "sensor data" may refer to any data received from any source by the DIG manager 100.

Based on the received information, and/or other relevant information (e.g., capabilities of display 120), DIG manager 100 may select a DIG representation from among a set of available DIG representations 130. Each DIG representation or template 130 may include, for instance, a footprint (e.g., a shape and/or size parameters that define a boundary for the DIG representation 130), positioning information (e.g., placement information relative to various display types), a listing of elements included in the DIG representation 130, element attributes, such as location within the DIG representation 130, and/or other relevant information (e.g., mappings of values to icons or other graphical indicators).

DIG templates may be selected based on various relevant factors, such as calculated values (e.g., a "matching" score or metric), indicated or provided values (e.g., a message may include an element that defines the DIG template to be used), default values (e.g., a helicopter display may be associated with a set of one or more DIG templates or a user profile for the pilot may indicate types of DIGs to be included in a display), etc. As an example, if information received from the sensors 110 includes information associated with a "weather" DIG template (e.g., temperature, humidity, wind speed, etc.), a relatively high matching score may be generated for the weather DIG template with respect to other available DIG templates, and the weather DIG template may be selected.

The DIG manager 100 may generate or instantiate the DIG 140 based on the received data and the DIG template 130 and provide the DIG 140 to display 120. Each display 120 may be a set of electronic devices or components that are able to provide information, such as text and/or graphics, to one or more users. DIG manager 100 may generate the DIG instantiation 140 by applying the received information to the components of the selected DIG template 130. For instance, weather information may be applied to the associated or relevant DIG elements (e.g., temperature may be displayed via a temperature feature, precipitation indicated via an icon, etc.). DIG manager 100 may provide the DIG instantiation 140 or dynamic graphical user interface (GUI) to the display in various appropriate formats and/or via various appropriate protocols (e.g., rendered images such as bitmaps, codecs or containers associated with streaming formats, hypertext markup language (HTML), etc.).

As the DIG manager 100 receives updated information from the sensors 110, user, and/or other resources or parties, the DIG manager 100 may generate an updated DIG instantiation 150 and send the updated DIG instantiation to the display 120. Updated DIG instantiation 150 may use the same formatting, parameters, and/or attributes as DIG 140 such that updated information is clearly and seamlessly presented to the user(s).

Figure 2:
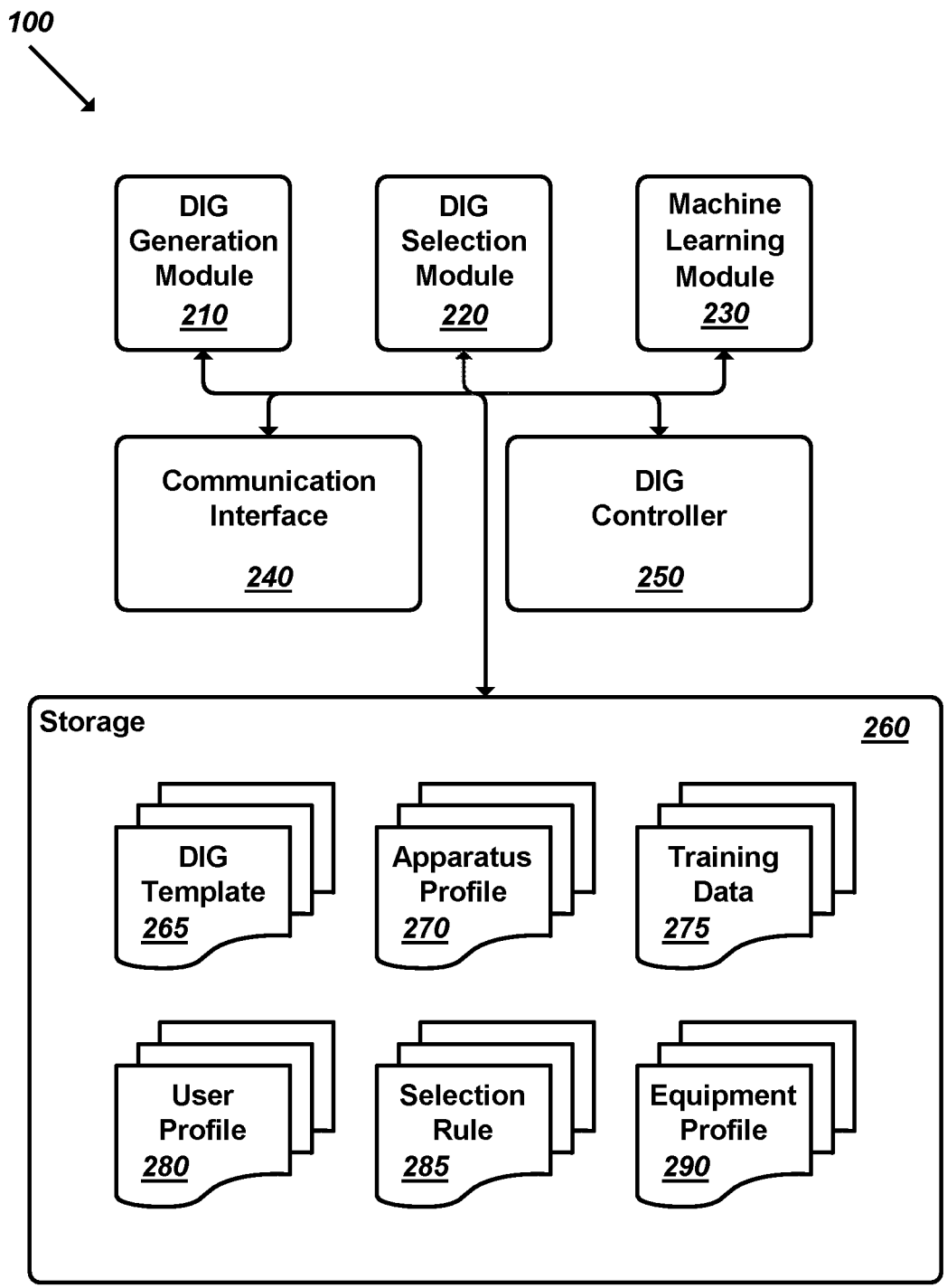
FIG. 2 illustrates a schematic block diagram of a DIG manager of one or more embodiments described herein.

FIG. 2 illustrates a schematic block diagram of a DIG manager 100 of one or more embodiments described herein. As shown, the DIG manager 100 may include a DIG generation module 210, a DIG selection module 220, a machine learning module 230, a communication interface 240, a DIG controller 250, and a storage 260. DIG manager 100 may be implemented via one or more devices, systems, components, etc.

DIG generation module 210 may generate or modify DIG templates 130. DIG generation module 210 may be able to identify data types (e.g., integer, rational number, text, discrete values, etc.), data categories (e.g., temperature or other weather-related measurements, location or positioning information, etc.), and/or otherwise identify relevant attributes associated with data received from sensors 110. Such data types, categories, etc. may be associated with various DIG components or elements (e.g., a two-digit display, a compass-type display, a set of icons, etc.).

DIG generation module 210 automatically generate a footprint, layout, set of components, and/or otherwise define a DIG template 130 based on received sensor data and/or other relevant data (e.g., user profile data, apparatus profile data, etc.). In some embodiments, DIG generation module 210 may allow user interaction via a resource such as communication interface 240 and/or a set of UI features. A user, such as an administrator, may be able to define, modify, organize, position, associate, and/or otherwise manipulate various components associated with one or more DIG templates 130. For example, a value received from a sensor may be identified as a temperature and may be associated with a temperature component by DIG generation module 210. The temperature component may be positioned at an unused or free area of the DIG template 130. As another example, a precipitation sensor or message may be associated with a precipitation element (e.g., an area for displaying icons representing clear weather, cloudy weather, rain, snow, etc.) by the DIG generation module 210 and the precipitation element may be positioned within the footprint of the DIG template 130. In some cases, and automatically-generated DIG template 130 may be modified by a user such as an administrator (e.g., by adding or removing components, by repositioning or resizing components, etc.).

DIG selection module 220 may be able to identify data types (e.g., integer, rational number, text, discrete values, etc.), data categories (e.g., temperature or other weather-related measurements, location or positioning information, etc.), and/or otherwise identify relevant attributes associated with data received from sensors 110. Such data types, categories, etc. may be associated with various DIG components or elements (e.g., a two-digit display, a compass-type display, a set of icons, etc.). DIG selection module 220 may generate a matching score or similar metric for each available DIG template 130 (which may include previously-generated templates and/or newly-created templates) and select the DIG template 130 with the highest matching score. Matching score or other metrics may be generated using various algorithms and/or operations. For instance, each DIG template 130 may be associated with a set of components, where each component may indicate or otherwise be associated with parameters or attributes such as a data type, data category, sensor type, data value, etc. Each component may be compared to the available data to determine whether the component "matches" the data. Some components may include a partial matching score. For example, if a component specifies a type and category of data, a match of either type or category may generate a partial score (e.g., a fifty percent match or other match weighting), whereas data that matches both type and category may generate a full score (e.g., one hundred percent match). Some components may require matching of all attributes.

As one example, a weather DIG template 130 may include a numerical temperature component, a numerical humidity component, and a mixed wind component including a numerical element and a direction graphic. If data is received from a temperature sensor, a humidity sensor, and a wind sensor and the data is provided as the indicated type, the matching score may be a full one hundred percent match. Continuing the example, if data is received from a temperature sensor and a humidity sensor, but not a wind sensor (e.g., if a sensor is malfunctioning or otherwise unavailable), a matching score of two thirds or sixty-seven percent may be calculated. In contrast, a navigation DIG template 130 may include a map element, a destination indicator element, route information elements, etc. and a matching score of zero may be generated when evaluated with respect to temperature sensor data, humidity sensor data, and wind sensor data. Matching scores may be sorted or otherwise evaluated to identify a DIG template 130 with the highest matching score. In some cases, a matching score may have to meet or exceed a specified threshold (e.g., fifty percent, seventy-five percent, or even one hundred percent matching) for a DIG template 130 to be selected.

Machine learning module 230 may implement various AI algorithms or models to generate estimates, predictions, scores or metrics, and/or otherwise provide relevant information to other components of the DIG manager 100. Machine learning module 230 may be able to evaluate various elements of DIG manager 100 and apply training data to optimize various models, profiles, rules, and/or other elements utilized by DIG manager 100.

For instance, models associated with DIG template selection may be trained using data such as user or administrator feedback. For instance, if a DIG template 130 is often selected or utilized by pilots (e.g., when a pilot is presented with multiple DIG options and a selection is made), a model may be updated such that the DIG template 130 is more likely to be selected in the future under similar conditions. As another example, if a DIG template 130 is often disabled or otherwise not used by the intended users, a model may be updated such that the DIG template 130 is less likely to be selected in the future under similar conditions. As another example of training data, administrator users may evaluate and grade various decisions made by current models, for instance affirming a selection of a particular DIG template 130 as being correct or appropriate or indicating that a selection of a particular DIG template 130 was incorrect or inappropriate.

Communication interface 240 may include various transmitters, receivers, translators, and/or other elements that may be utilized to receive information and/or instructions from various sources and/or send information and/or instructions to various destinations. For example, communication interface 240 may include, utilize, and/or otherwise be associated with features such as radio transmitters and/or receivers, cellular communication features, network adaptors (e.g., ethernet), etc. Communication interface 240 may utilize, and/or otherwise be compatible with, various messaging or communication protocols. Communication interface 240 may include, utilize, and/or otherwise be associated with conversion or translation (e.g., speech-to-text, text-to-speech, etc.). Thus, for instance, radio communications from other users may be converted to text and the text may be analyzed and mapped to updates associated with various DIG elements (e.g., an updated destination provided over a voice-based radio channel may be automatically converted to a representation displayed via the DIG). Communication interface 240 may include translation or interface elements such as, for example, conversion of data (e.g., analog-to-digital conversion of received signals), manipulation of data (e.g., translating a message or signal associated with a first protocol to a message or signal associated with a different protocol), dividing received data into components (e.g., packets, messages, etc.), and/or otherwise processing or manipulating data received from other resources.

DIG controller 250 may be, include, and/or utilize elements, such as processors, that are capable of executing instructions and/or manipulating data. DIG controller 250 may at least partly direct the operations of other components of the DIG manager 100 and/or facilitate communications among the components.

Storage 260 may include devices, application programming interfaces (APIs), and/or other resources that may allow the DIG manager 100 to store, access, modify, delete, and/or otherwise manipulate various data elements associated with the DIG manager 100. Storage 260 may include, reference, and/or otherwise provide access to elements such as DIG template elements 265, apparatus profiles 270, training data 275, user profiles 280, selection rules 285, equipment profiles 290, and/or other appropriate structures or elements.

Each DIG template element 265 may be a file or other structure that includes information related to a DIG template 130. The DIG template element 265 may include, for instance, a unique identifier or serial number, a listing of DIG components, location for each component, input types, calculations or mappings to convert or format received data for presentation, display attributes (e.g., position, color capabilities, etc.), weightings for matching score generation, listings of associated equipment or apparatus, and/or other relevant information or elements.

Each apparatus profile 270 may be a file or other structure that includes information related to an apparatus that may be utilized by one or more users (e.g., a vehicle, aircraft, etc.). The apparatus profile 270 may include elements such as a unique identifier, apparatus type, apparatus model, available display type(s) and/or attributes, available local sensor types (e.g., a temperature sensor physically coupled to a vehicle), a listing of enabled or authorized DIG templates 130, and/or other relevant information.

Each set of training data 275 may include feedback information related to various DIG manager 100 operations, such as feedback regarding DIG template generation, DIG template selection, data presentation, DIG location, etc. Training data 275 may include feedback associated with DIG template components. For instance, users may be able to select from several types of temperature display elements and training data may indicate which temperature display elements are selected (or not deselected) more often or less often by users.

Each user profile 280 may include information related to a particular user. Such information may include, for instance, a unique identifier, user type (e.g., pilot, operator, technician, and/or other relevant designations.), listings of associated equipment and/or apparatus (e.g., a vehicle, helmet, etc.), listings of associated users (e.g., superiors, sub-ordinates, peers, etc.), and/or other relevant information related to the user. The user profile 280 may include DIG preferences, such as preferred DIG templates 130, positioning of elements, DIG location within a display, etc.

Each selection rule 285 may include matching criteria, weighting, and/or other evaluation information that may be utilized to select a DIG template 130 from among the available or enabled templates. Selection rules 285 may be associated with DIG templates 265, apparatus profiles 270, user profiles 280, equipment profiles 290, and/or other elements.

Each equipment profile 290 may be a file or other structure that includes information related to equipment associated with a specific user (e.g., a helmet or other wearable device, a smartphone, a tablet, etc.). The equipment profile 290 may include elements such as a unique identifier, equipment type, equipment model, available display type(s) and/or attributes, available local sensor types (e.g., an accelerometer embedded in a smartphone, a camera associated with a tablet, etc.), a listing of enabled or authorized DIG templates 130, and/or other relevant information.

One of ordinary skill in the art will recognize that different embodiments of the DIG manager 100 may include various different components, arrangements of components, and/or otherwise be implemented in various different ways without departing from the scope of the disclosure. For example, in some embodiments, storage 260 may include or access other data structures or elements such as, for instance, sensor profiles (including, for example, a unique identifier, sensor type, sensor category, data output type, etc.), graphical interface components (e.g., a compass element, a warning indicator, etc.), mission plans, commander profiles, equipment and/or apparatus groupings or associations, and/or other relevant data elements. As another example, DIG manager 100 may include a module such as a UI module for receiving user inputs and/or providing information to a user outside of the DIG framework.

Figure 3:
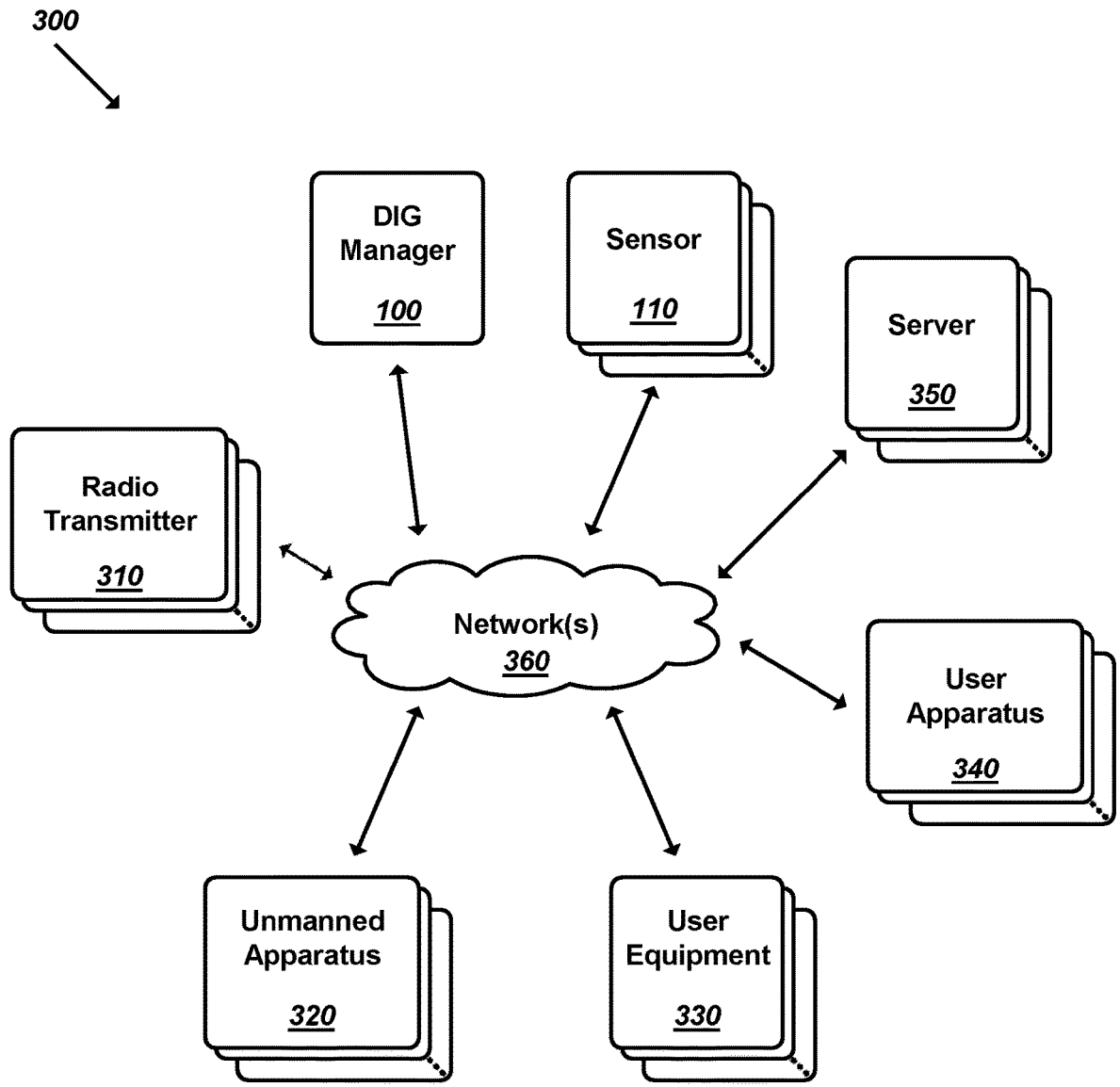
FIG. 3 illustrates a schematic block diagram of a DIG operating environment of one or more embodiments described herein.

FIG. 3 illustrates a schematic block diagram of a DIG operating environment 300 of one or more embodiments described herein. As shown, environment 300 may include DIG manager 100, sensors 110, radio transmitters 310, unmanned apparatus 320, user equipment 330, user apparatus 340, servers 350, and/or networks 360.

Each sensor 110 may be a device, component, or set of devices able to communicate across network 360 and to generate or provide some data or signal (e.g., a measured or calculated value or signal representation thereof). Sensors 110 may communicate with various other elements across local channels when appropriate. For instance, another component may have a sensor that is physically coupled to the component (e.g., an accelerometer embedded in a smartphone, a body temperature sensor coupled to a wearable device, an altimeter may be coupled to an unmanned aircraft apparatus 320, etc.).

Each radio transmitter 310 may be able to send various messages or signals over a communication channel such as a radio channel and/or other wireless or wired network channels. Radio transmitter 310 may be a sub-type of sensor 110 and/or a sub-component of another component of environment 300 (e.g., user apparatus 340, user equipment 330, etc.). Data may include various message types and/or components (e.g., voice communications, text communications, signals or beacons, etc.). Each radio transmitter 310 may include, utilize, or be associated with a receiver that is able to receive messages from other components over a communication channel such as a radio channel and/or other wireless or wired network channels.

Each unmanned apparatus 320 may be an entity such as an aircraft or vehicle that is operated by a remote pilot or operator via network 360. Unmanned apparatus 320 may be a sub-type of sensor 110 and/or may be associated with another component of environment 300 (e.g., a pilot may at least partly control the unmanned apparatus 320 via user equipment 330). DIG templates 130 associated with unmanned apparatus 320 may include measurements or information associated with the unmanned apparatus 320 (e.g., location, altitude, fuel level, etc.) that is provided via a display associated with user equipment 330.

Each user equipment 330 may be a device such as a smartphone, tablet, personal computer, workstation, wearable device, and/or other appropriate device or set of components that is able to communicate across network 360, provide information to one or more users, and/or receive information from the user(s). User equipment 330 may be a sub-type of sensor 110 and/or provide information from sensors 110 associated with the user equipment 330 (e.g., location or position sensors, cameras, etc.). Display 120 may be a specific type of user equipment 330 and/or may be provided via user equipment 330 (e.g., a touchscreen). In some cases, a particular user equipment 330 may be associated with a particular user, such that a user profile 280 associated with the particular user may be used to select or otherwise implement various DIG features.

Each user apparatus 340 may be an entity such as an aircraft, vehicle, or structure that is utilized and/or operated by users such as a pilot and/or other crew. User apparatus 340 may be a sub-type of sensor 110 and/or be associated with various sensors 110 (e.g., location sensors associated with a vehicle or aircraft, cameras coupled to the apparatus, etc.). Display 120 may be a sub-component of user apparatus 340 and/or may be provided via a resource of user apparatus 340 (e.g., a mounted display screen). In some cases, a particular user apparatus 340 may be associated with particular user equipment (e.g., multiple helmets associated with an aircraft) via an apparatus profile 270 or similar resource. The user apparatus 340 may be able to communicate across networks 360 and/or across local channels (e.g., with user equipment 330 via a wired connected).

Each server 350 may be a computing device that is able to execute instructions and/or otherwise process data. In some embodiments, server 350 may include, or provide access to, a resource such as a storage which may be accessible via a resource such as an API. Server 350 may be a sub-type of sensor 110 and/or provide sensor information from various other components of environment 300. DIG manager 100 may interact with one or more servers 350 to receive updates (e.g., updated models, rules, mission plans, sensor data, DIG templates, etc.), receive or distribute training data, and/or otherwise implement the DIG manager 100 functionality.

In some embodiments, a resource such as server 350 may be used to implement various back-end functionality, such as machine learning, application of AI algorithms, autonomous system behaviors, etc. while DIG manager 100 may implement front-end services such as GUI generation and monitoring.

Networks 360 may include various communication pathways, such as local wireless channels (e.g., Bluetooth, Wi-Fi, etc.), cellular networks, the Internet, and/or any other communications pathways over which data may be transmitted (e.g., wired network paths such as via Ethernet). In addition to communications across networks 360, some components may communicate across local connections or channels. For instance, user equipment 330, such as a helmet, may be connected to a user apparatus 340, such as a vehicle or aircraft, via a cable or other physical connector.

DIG manager 100 may include, utilize, and/or be implemented via any combination of the devices or components 110 and 310-360 associated with environment 300, and/or other appropriate devices or components.

One of ordinary skill in the art will recognize that the environment 300 may be implemented in various different ways without departing from the scope of the disclosure. For instance, some elements may be omitted and/or other additional elements may be included. As another example, elements may utilize different communication pathways than shown. As still another example, various sub-components and/or associated devices or components of the described elements may provide some or all of the described functionality. For instance, user apparatus 340 may house a user device (e.g., a tablet) that implements the DIG manager 100 without interacting with user apparatus 340.

Figure 4:
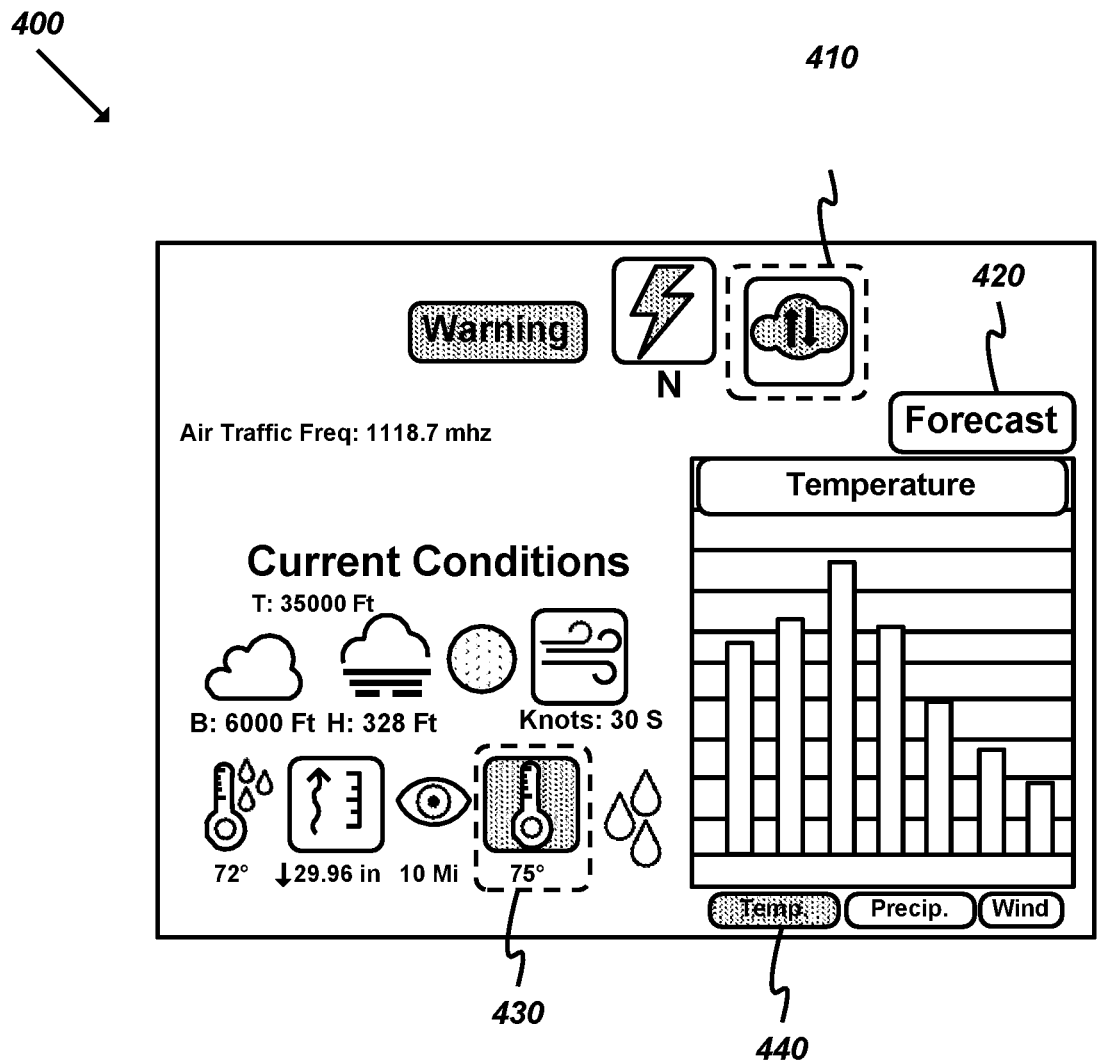
FIG. 4 illustrates an example DIG of one or more embodiments described herein, in which weather information is provided.

FIG. 4 illustrates an example DIG 400 of one or more embodiments described herein, in which weather information is provided. As shown, in this example the DIG 400 may have a rectangular footprint. DIG 400 may include various components, such as graphical icons or indicators 410, text-based labels, buttons, or indicators 420, multimedia elements 430 including graphics and/or text-based elements, selectable elements or buttons 440, and/or other appropriate elements.

Some DIG elements may be static elements, such as the "Air Traffic Freq:" label in this example. Some DIG elements may be dynamic elements that are updated based on received data, such as the temperature graph, wind speed and direction indicator, and/or barometric pressure indicator in this example. Some DIG elements may be hybrid elements that include static components (e.g., a "temperature" label) and dynamic components (e.g., a bar graph showing temperature values over time).

In this example, the DIG 400 may include elements associated with information such as cloud cover, cloud ceiling, precipitation, visibility, wind speed and direction, fog, air pressure, temperature, and dewpoint.

Figure 5:
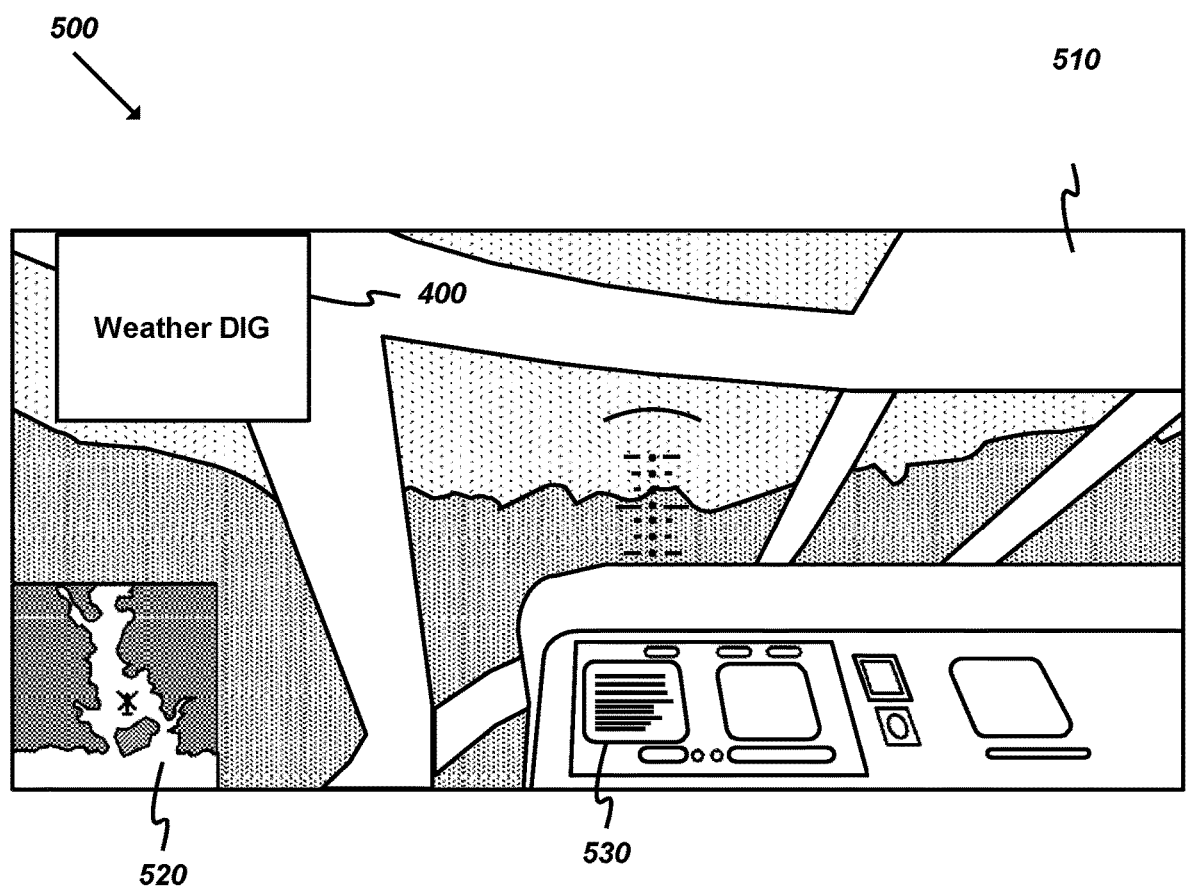
FIG. 5 illustrates an example user view including a DIG of one or more embodiments described herein, in which weather information is provided.

FIG. 5 illustrates an example user view 500 including a DIG of one or more embodiments described herein, in which weather information is provided. User view 500 may be associated with a physical environment (e.g., a cockpit), a virtual environment, or a mixed-reality environment. As shown, the user view 500 may include a view of physical structures 510, such as a helicopter canopy via a visor or other heads-up display. The user view 500 may include elements such as weather DIG 400, a map or navigation element 520, and/or other elements such as horizon indicators, flight path indicators, etc.

In this example, a nine-line display 530 is available to the user, along with other communication or user interaction features. Different embodiments may include various different user interaction features that may be able to interact with the DIG manager 100. Such user interaction features may include, for instance, displays, touchscreens, joysticks, mice, keyboards, keypads, voice-control inputs (e.g., microphones), position-sensing elements (e.g., goggles or other wearable devices that sense head position, direction, etc.), and/or other appropriate user interaction features (e.g., haptic feedback elements).

Figure 6:
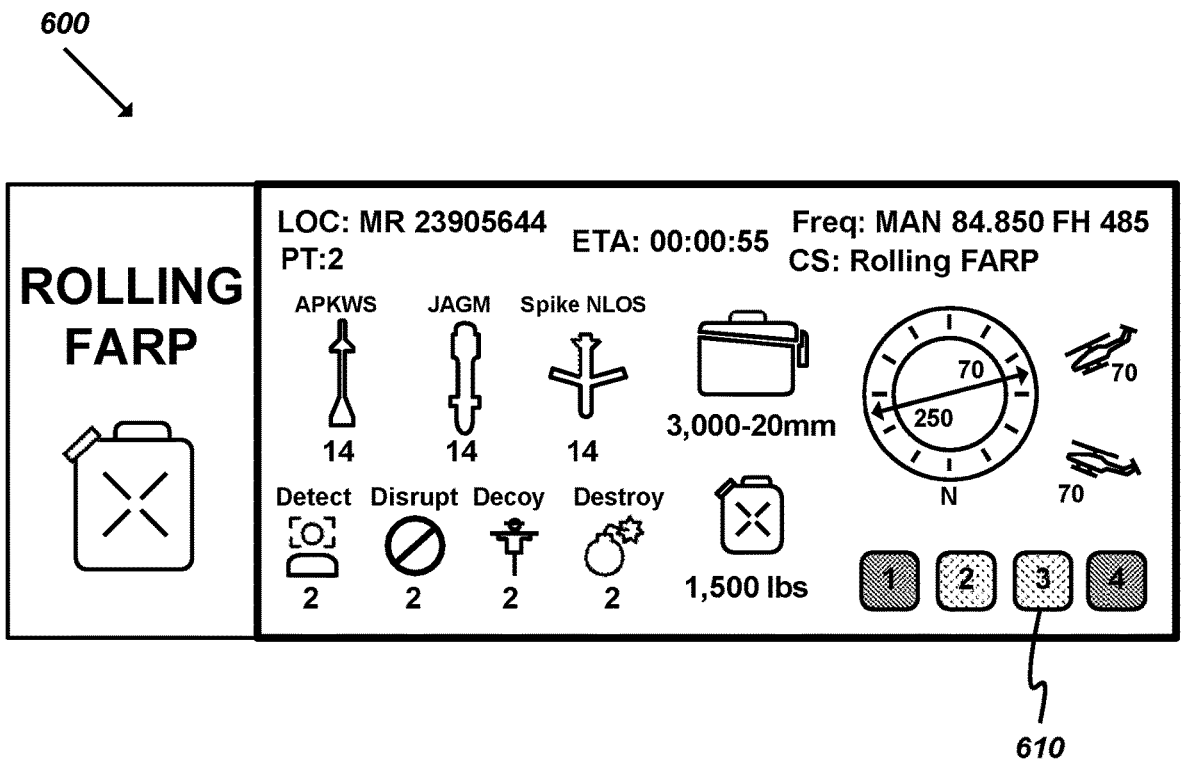
FIG. 6 illustrates an example DIG of one or more embodiments described herein, in which restocking information is provided.

FIG. 6 illustrates an example DIG 600 of one or more embodiments described herein, in which restocking information is provided. As shown, DIG 600 is associated with a forward arming and refueling point (FARP) and includes elements such as FARP type (e.g., rolling, active, silent, jump), location, frequency and call sign information, fuel availability, traffic control (e.g., landing direction, takeoff direction, traffic direction, holding pattern, holding area), chemical, biological, radiological, and nuclear (CBRN) condition (if any), munition types and available quantities (e.g., joint air-to-ground missiles, advanced precision kill weapon system (APKWS), spike non-line of sight (NLOS), twenty millimeter rounds, etc.), and air launched effects (ALEs), indicating type and number of each (e.g., detect, identify locate, report (DILR) ALEs, decoy ALEs, disruptor ALEs, and lethal ALEs).

In addition, this example DIG 600 includes landing point indicators 610 that may indicate the number of available points, total number of points, queue length, wait time, and/or other relevant information. In this simple example, there are four total points, with two points indicated as being available and two points unavailable. In this example, such states are indicated by fill patterns. Actual DIG implementation may use indications such as color shading (e.g., green indicating an open point and red indicating a point with a wait time).

Figure 7:
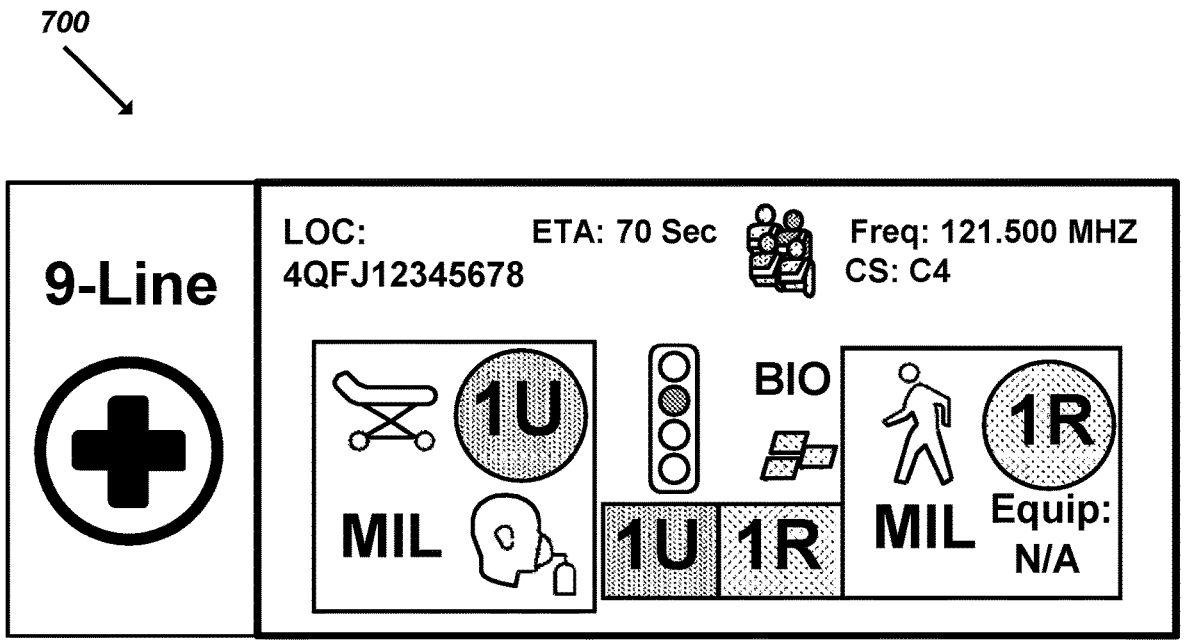
FIG. 7 illustrates an example DIG of one or more embodiments described herein, in which medical evacuation information is provided.

FIG. 7 illustrates an example DIG 700 of one or more embodiments described herein, in which medical evacuation information is provided. As shown, example DIG 700 may be associated with a nine-line messaging system or display. In this example, the DIG 700 indicates medical evacuation information such as location, radio frequency and call sign, number of patients by precedence (e.g., urgent, urgent surgical, priority, routine, convenience, etc.), equipment required (e.g., none, hoist, extraction equipment, ventilator, etc.), number of patients by type (e.g., litter, ambulatory, etc.), security at the pick-up site (e.g., no enemy troops in area, possible enemy troops in area (approach with caution), enemy troops in area (approach with caution), enemy troops in area (armed escort required), etc.), method of marking the pick-up site (e.g., panels, pyrotechnic signal, smoke signal, none, other), patient nationality and status (e.g., U.S. military, U.S. civilian, non-U.S. military, non-U.S. civilian, enemy prisoner of war (EPW), etc.), and nuclear, biological, or chemical (NBC) contamination information (e.g., nuclear, biological, chemical). Such information is relayed using a combination of graphics and text-based indications. In some cases, such as during peacetime operations, various elements may be used to indicate other information. For example the security at pick-up site indicator may be replaced by, or transposed to represent, an element indicating number and types of wounds, injuries, and illnesses. As another example, an NBC contamination indicator may be replaced by, or transposed to represent, an element that provides a terrain description of the pick-up site.

FIG. 8 illustrates an example communication 800 of one or more embodiments described herein, in which medical evacuation information is provided via a nine-line display. FIG. 9 illustrates an example mapping 900 of one or more embodiments described herein, in which medical evacuation information is converted to a nine-line format. As shown, the information is communicated in an arcane and text-intensive way that requires a user to memorize codes or refer to a mapping table. This is in contrast to the accessibility of information provided via a DIG such as DIG 700.

Figure 10:
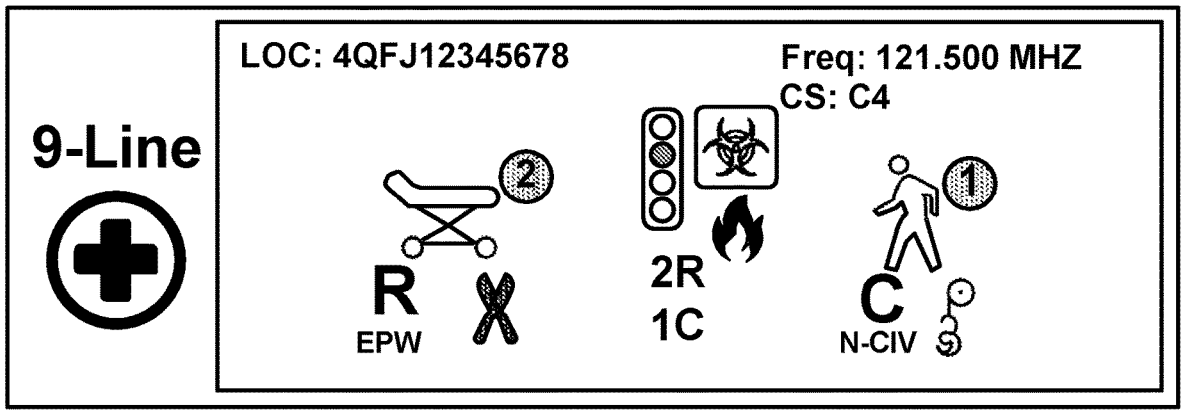
FIG. 10 illustrates an example DIG of one or more embodiments described herein, in which medical evacuation information relevant to a first tier of information is provided.

FIG. 10 illustrates an example DIG 1000 of one or more embodiments described herein, in which medical evacuation information relevant to a first tier of information is provided. In this example, the information is related to "what" is happening, or a current assessment of the situation based on the received data. DIG 1000 may include similar elements as DIG 700 described above.

Figure 11:
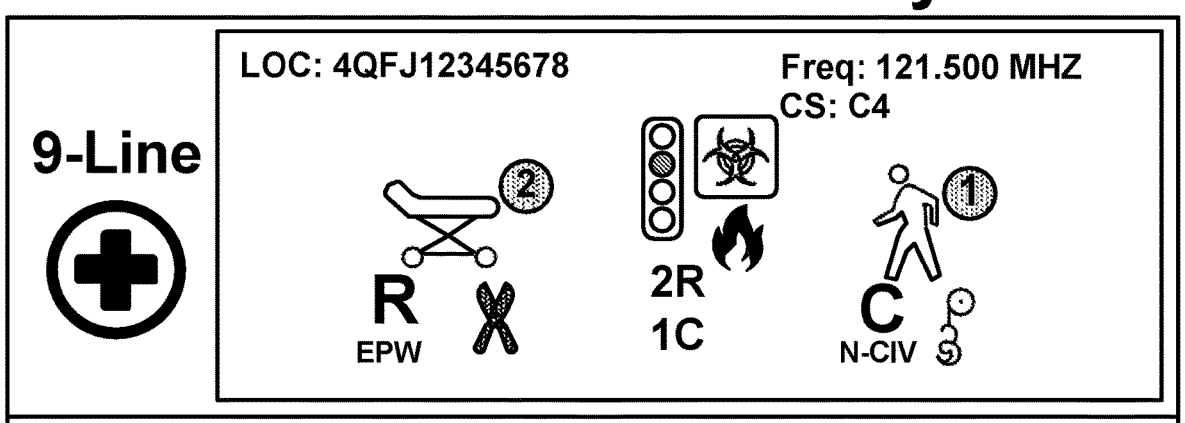
FIG. 11 illustrates an example DIG of one or more embodiments described herein, in which medical evacuation information relevant to a second tier of information is provided.

FIG. 11 illustrates an example DIG 1100 of one or more embodiments described herein, in which medical evacuation information relevant to a second tier of information is provided. In this example, element 1110 has been added to DIG 1000 to provide an indication as to "why" an action has been requested or suggested and any relevant factors in determining that action. In this example, security at the pick-up site is indicated as being "red", indicating enemy troops in area (armed escort required), thus indicating that the resource (e.g., a medical helicopter) can expect armed escort support. In addition, the top factor in determining the action is indicated as being an enemy SPOT report, which may indicate information such as number of troops, equipment and weapons, locations, etc.

Figure 12:
FIG. 12 illustrates an example DIG of one or more embodiments described herein, in which medical evacuation information relevant to a third tier of information is provided.

FIG. 12 illustrates an example DIG 1200 of one or more embodiments described herein, in which medical evacuation information relevant to a third tier of information is provided. In this example, element 1210 has been added to DIG 1100 to provide an indication as to "next" or predicted actions based on current information. In this example, the prediction is that upon arrival in ninety seconds, the security status will be "green", indicating no enemy troops in the area. Further, the top factor for the prediction is provided (inbound future attack reconnaissance aircraft (FARA) gunship attack).

Figure 13:
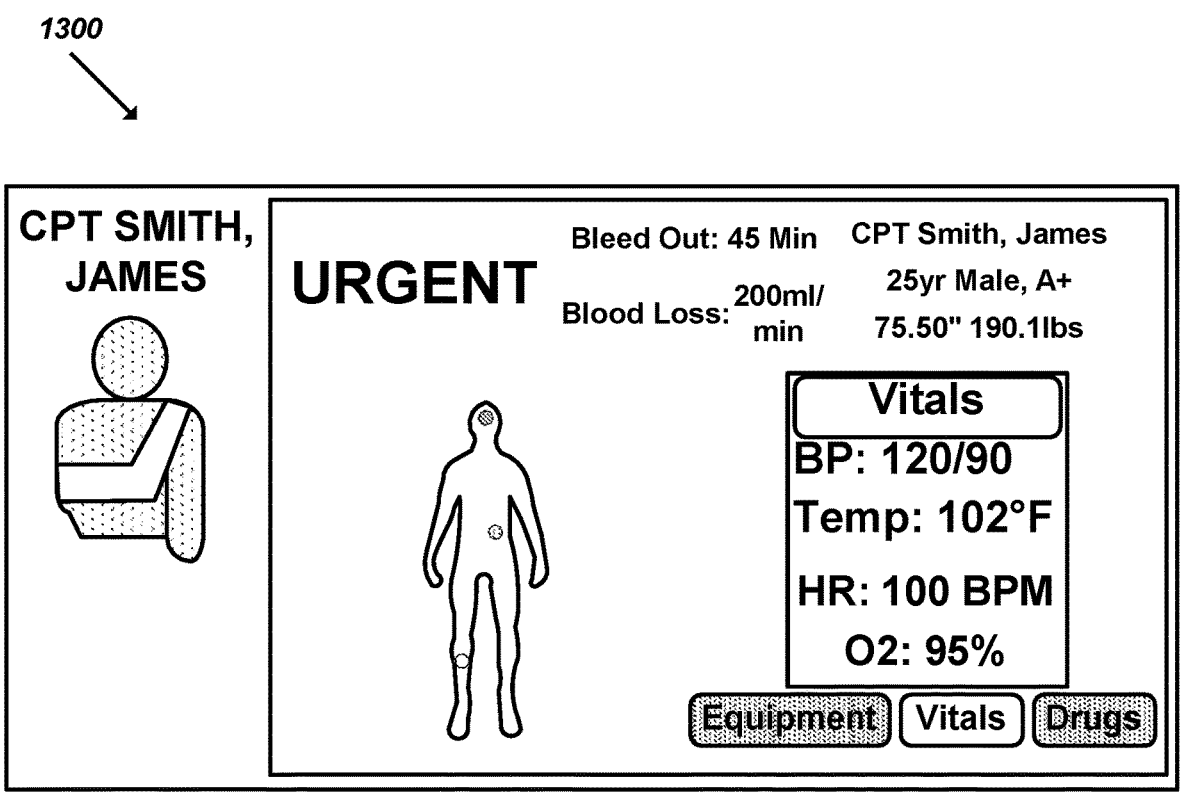
FIG. 13 illustrates an example DIG of one or more embodiments described herein, in which medical information associated with a particular user is provided.

FIG. 13 illustrates an example DIG 1300 of one or more embodiments described herein, in which medical information associated with a particular user is provided. As shown, in this example, the DIG may include AI-based dynamic reporting based on readings received from sensors associated with the soldier. In this example, the circles and fill patterns (e.g., representing colors) may indicate injuries, such as a compound tibia fracture, perforated spleen, and a head injury. Other information may include vitals, suggested drug treatments, and predicted equipment needs. In this example, a "vitals" toggle button has been selected, and various sensor readings associated with biometric measurements are provided (e.g., blood pressure, body temperature, heart rate, etc.). A DIG such as DIG 1300 may be invoked, for instance, by selecting an element such as the "1U" indicator of DIG 700.

Figure 14:
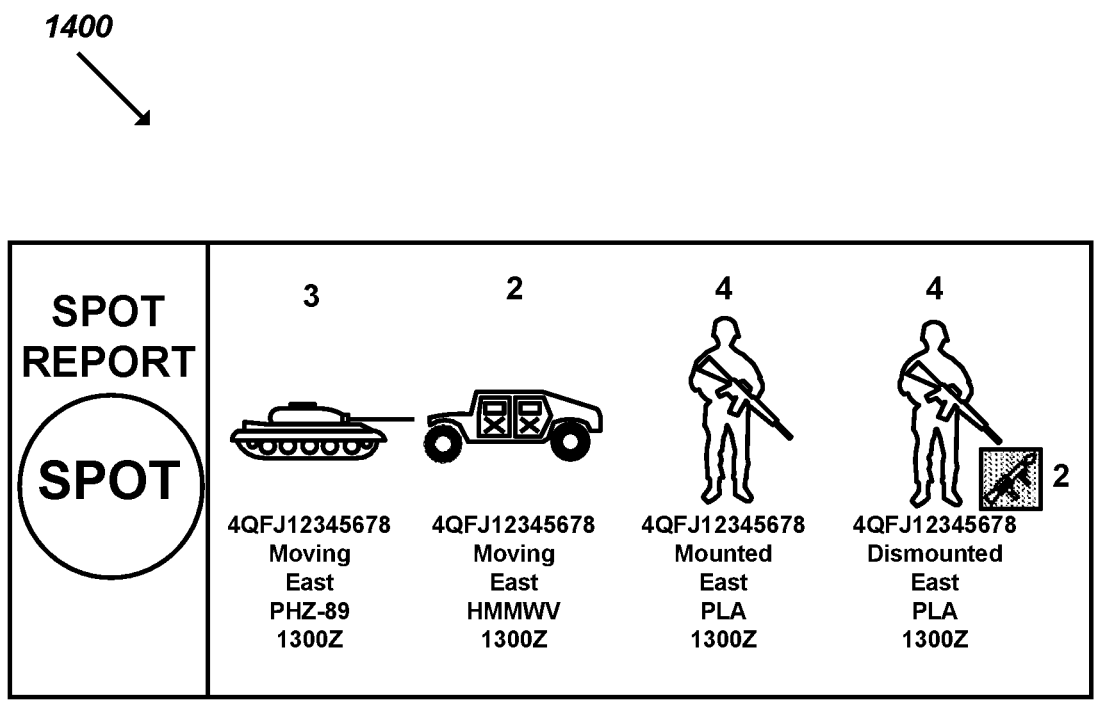
FIG. 14 illustrates an example DIG of one or more embodiments described herein, in which resource information is provided.

FIG. 14 illustrates an example DIG 1400 of one or more embodiments described herein, in which resource information is provided. As shown, a "SPOT" report may include information such as size (e.g., number of persons, vehicles seen, size of an object, etc.), activity (e.g., description of enemy activity such as assaulting, fleeing, observing), location (e.g., where the enemy was cited such as by grid coordinate or reference point), unit (e.g., distinctive signs, symbols, or identification on people, vehicles, aircraft, or weapons, such as numbers, patches, clothing type, etc.), time (e.g., time the activity is observed, duration of activity, etc.), and equipment (e.g., equipment and vehicles associated with the activity). In this example DIG 1400, size information is provided via numbers at the top of the DIG 1400, equipment is indicated via graphics of tanks, transports, and weapons, and text-based indicators (e.g., "PHZ-89"). Activity is indicated via a one-word description (e.g., moving, mounted, dismounted, etc.).

Figure 15:
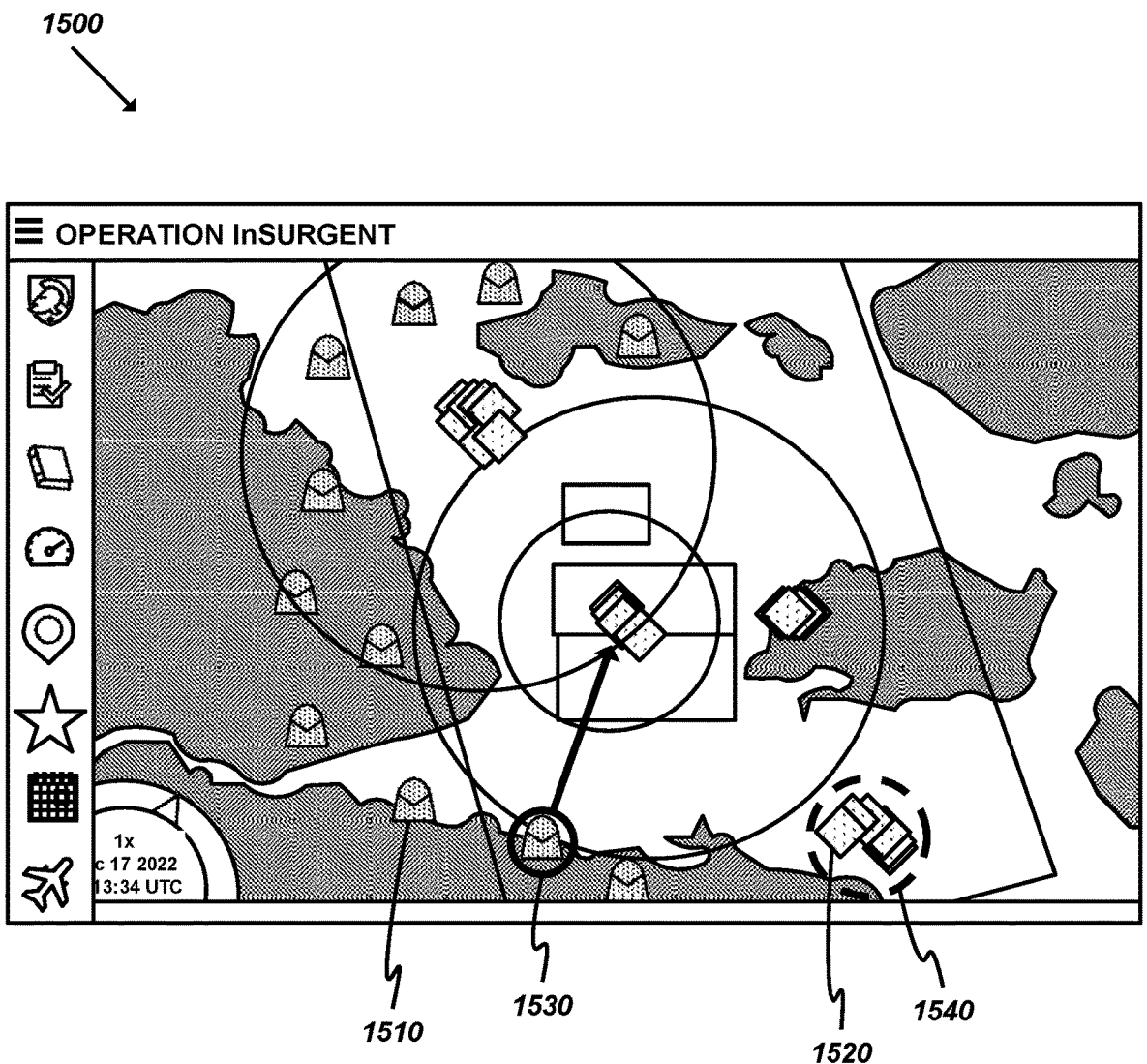
FIG. 15 illustrates an example DIG of one or more embodiments described herein, in which mission command information is provided.

FIG. 15 illustrates an example DIG 1500 of one or more embodiments described herein, in which mission command information is provided. DIG 1500 may be associated with systems enhanced small unit (SESU) operations. As shown, friendly forces or resources may be indicated by a first icon and/or color 1510, while enemy troops or resources may be indicated by a second icon and/or color 1520. DIG 1500 may include various geographic features and/or map elements as shown. This example further includes a predicted next enemy target, as indicated by element 1530 and a range of attack indicator 1540 associated with enemy forces 1520. DIG 1500 may include features such as a timeline and playback controls (e.g., play, pause, fast forward, etc.), such that a user may be able to evaluate or review an operation. DIG 1500 may include various menu elements (e.g., the icons along the left side in this example) that may allow selection of features such as "order of battle", "SESU", "plans", "objectives", "significant actions or activities (SIGACTS)", "distinguished service medal (DSM)", "sync matrix", and "mission plans". Various elements may be selectable. For instance, element 1510 may be selected to provide additional information about troops and/or resources associated with the friendly forces indicator.

Figure 16:
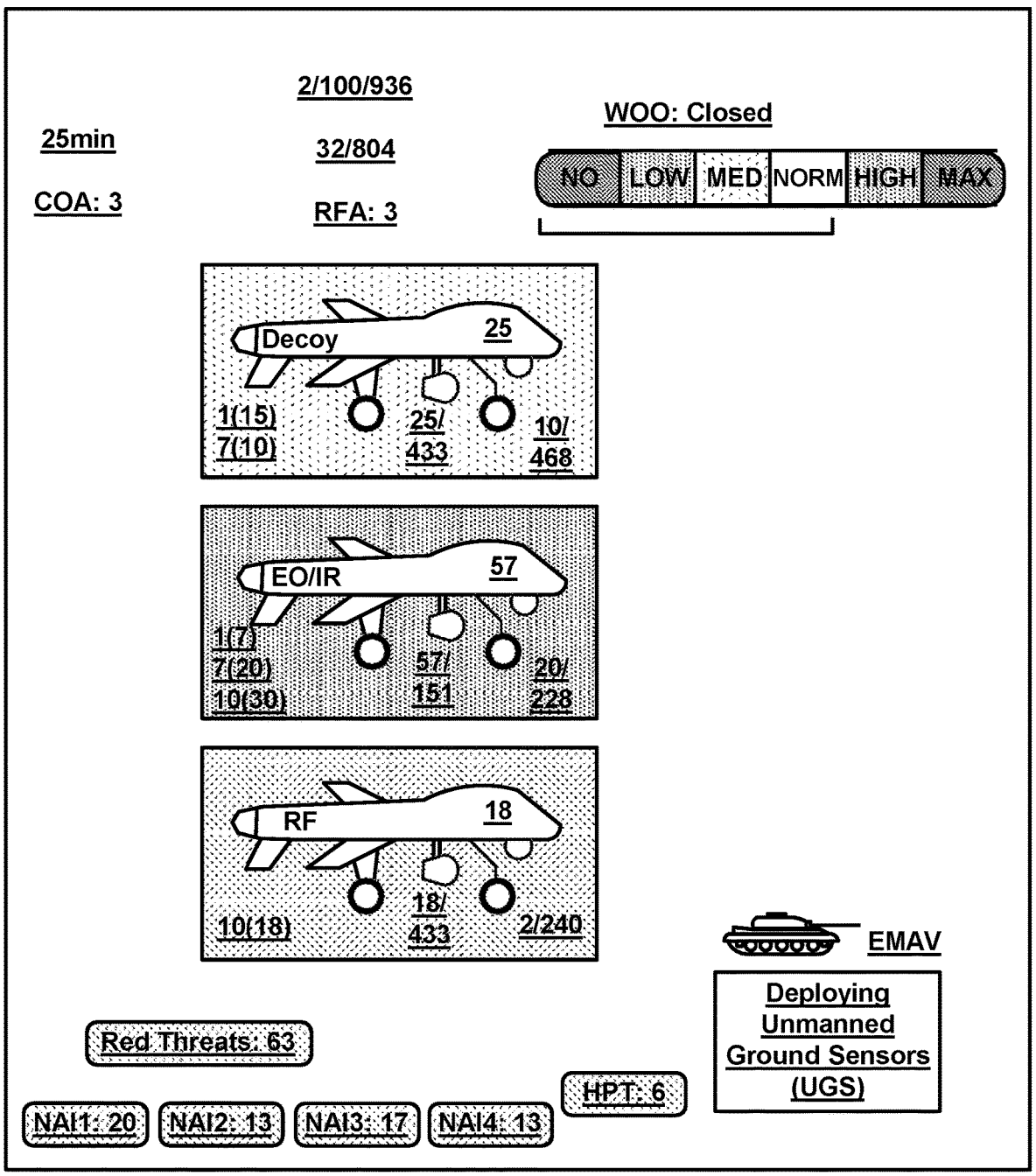
FIG. 16 illustrates an example DIG of one or more embodiments described herein, in which resource information is provided.

FIG. 16 illustrates an example DIG 1600 of one or more embodiments described herein, in which resource information is provided. DIG 1600 may be invoked by selecting an element such as element 1510 from DIG 1500. As shown, DIG 1600 may include tier one information (i.e., "what"), such as asset type (e.g., decoy, electro-optical/infrared (EO/IR) imaging unit, RD communication unit, etc.), number of assets in the air (by type), number of assets in reserve (by type), number of asset containers, battle damage assessment (BDA) attritted (by type), status (e.g., "deploying unmanned ground sensors (UGS)"), and/or other relevant information. In this example DIG 1600, other information includes time in mission, current course of action (COA), swarms in the air, assets in the air, assets in reserve, starting number of UASs, BDA attritted UASs. DIG 1600 further includes threat information, window of opportunity (WOO) status, and mission status ("NORM" or normal in this example).

Figure 17:
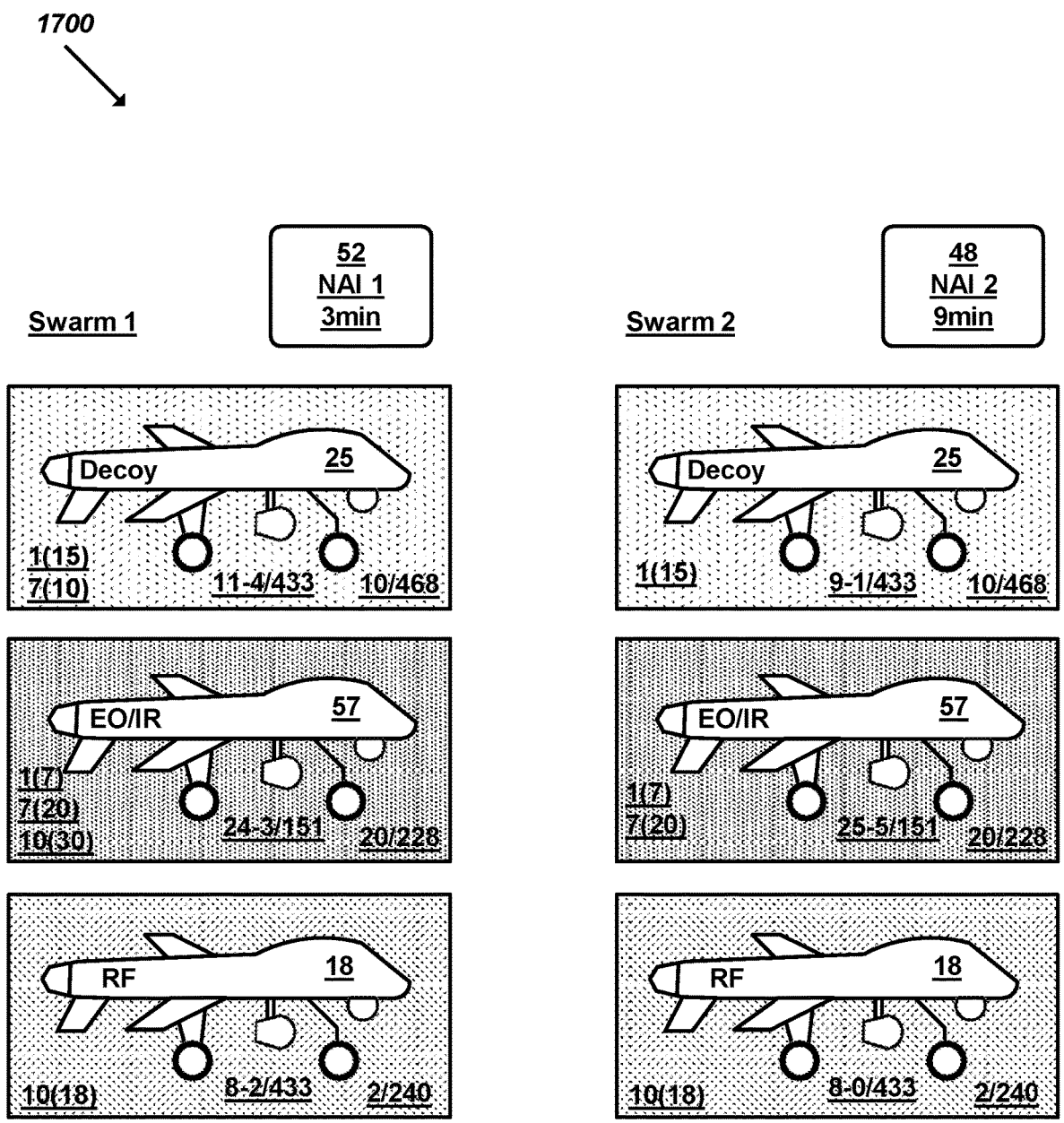
FIG. 17 illustrates an example DIG of one or more embodiments described herein, in which resource information for groups of resources is provided.

FIG. 17 illustrates an example DIG 1700 of one or more embodiments described herein, in which resource information for groups of resources is provided. As shown, swarm DIG 1700 may include swarm information such as number of assets in the swarm, swarm name or identifier, next objective, and time to next objective. Multiple types of assets are shown, with remaining assets, container information, compromised assets (e.g., assets that have lost communications), and BDA attritted assets information provided via the numerical indicators associated with the various asset representations.

Figure 18:
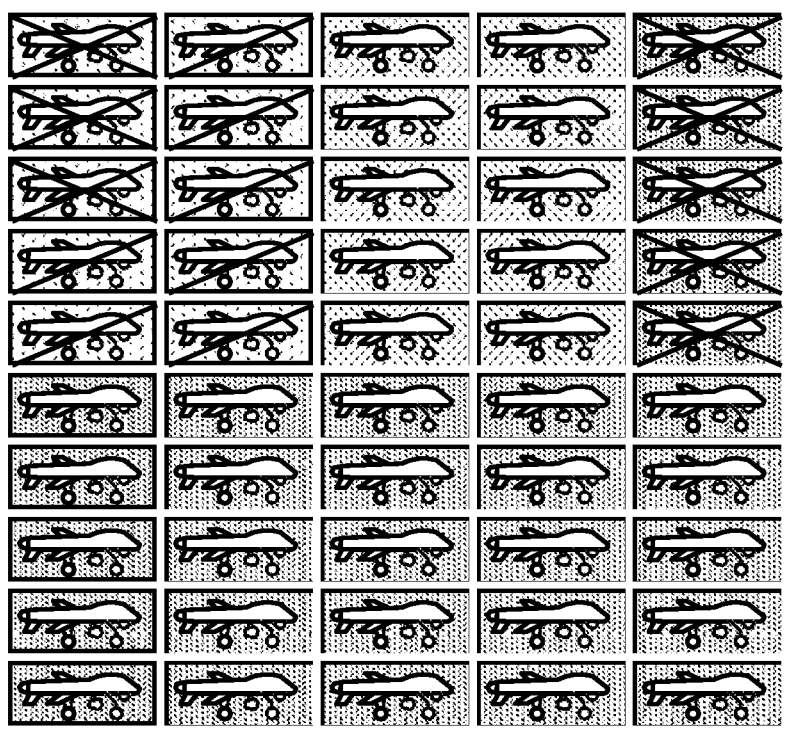
FIG. 18 illustrates an example DIG of one or more embodiments described herein, in which resource information for associated resources is provided.

FIG. 18 illustrates an example DIG 1800 of one or more embodiments described herein, in which resource information for associated resources is provided. As shown, different types of assets are indicated by different fill patterns. In addition, BDA attritted assets are indicated by an "X" mark and compromised assets are indicated by a cross line. A summary of compromised assets, BDA assets, and available assets of each type (and total number) is provided.

One of ordinary skill in the art will recognize that the example DIGS 400 and 600-1800 may be implemented in various different ways without departing from the scope of the disclosure. For instance, the footprint or outline shape of each DIG may be changed or resized. As another example, additional components may be included and/or some components may be omitted. The components may be presented in different arrangements than shown and/or with different relative sizing. As another example, some DIGs may include additional components, such as menus, that may allow selection among available DIGs and/or allow for other use inputs to be received by the DIG manager 100.

Figure 19:
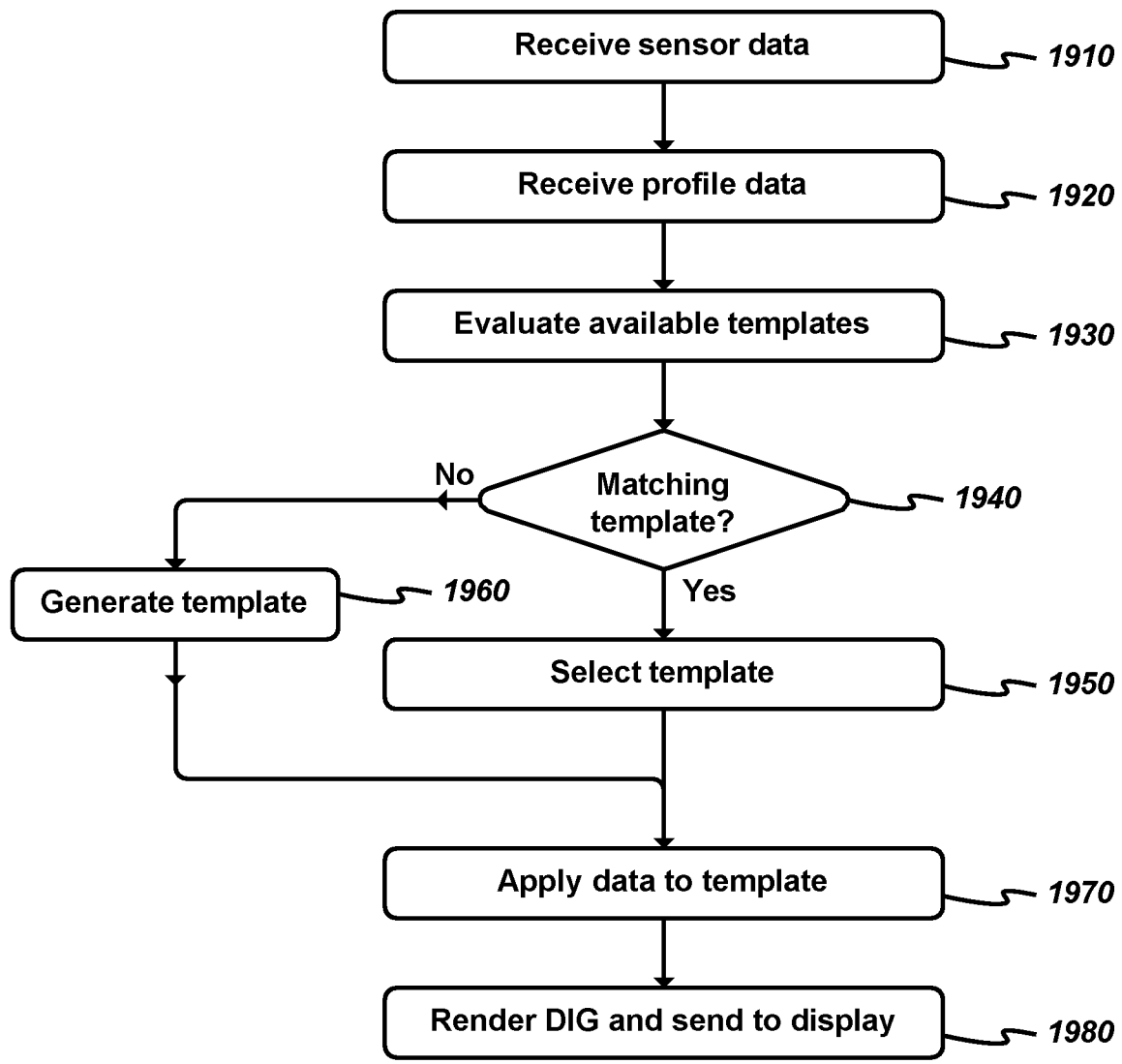
FIG. 19 illustrates a flow chart of an exemplary process that generates DIGs.

FIG. 19 illustrates an example process 1900 for generating DIGs. The process may identify an appropriate DIG template based on received sensor data and generate, using the template, a DIG for presentation via an appropriate display, such as display 120. The process may be performed when a DIG manager 100 is powered on or enabled, when a device such as user apparatus 340 or user equipment 330 is enabled or powered on and establishes a connection to the DIG manager 100, and/or under other appropriate conditions. In some embodiments, process 1900 may be performed by DIG manager 100. Process 2000 may be performed using, or via, various AI resources such as intelligent agents and machine learning models.

In some cases, process 1900 may be performed when a message or request for a DIG is received from a resource such as user equipment 330 and/or other components. Such a message may indicate various DIG parameters that may at least partly control DIG generation. For instance, the message may indicate a footprint (e.g., DIG size and/or shape information), DIG type (e.g., weather, navigation, etc.), and/or other appropriate information.

As shown, process 1900 may include receiving (at 1910) sensor data. Sensor data may be received at DIG manager 100 from various sensors 110 and/or other components, such as radio transmitters 310, unmanned apparatus 320, user equipment 330, user apparatus 340, server 350, and/or other appropriate components. Sensor data may be received over channels such as network 360. Sensor data may include measured values, output signals, and/or other appropriate data. The sensor data may include source information, such as a unique sensor identifier, sensor type, measurement type, output attributes (e.g., accuracy, number of digits, etc.), and/or other relevant information. Sensor data may include communications received from other elements or resources, such as messages, signals, etc. For instance, a radio communication indicating a location may be received as "sensor data" even if the information is conveyed by speaking (e.g., audio data may be captured and converted to text).

Received sensor data may be filtered and/or processed in various appropriate ways. If multiple sensors 110 of the same type are available, readings may be averaged, non-conforming values may be rejected or ignored, and/or otherwise be processed or filtered (e.g., by applying sensor profile information to set gain or other parameters associated with a sensor, sensor type, etc.). For instance, if temperature readings are available from multiple sensors 110 near the same location, the readings may be averaged to generate a single value. As another example, readings from a sensor 110 such as body temperature sensors may be limited to a specified range (e.g., not to exceed one hundred seven degrees Fahrenheit).

Process 1900 may include receiving (at 1920) profile data. Profile data may be received from a resource such as storage 260. Profile data may include, for instance, user profile information (e.g., via user profiles 280), sensor profile information, apparatus profile information (e.g., via apparatus profiles 270), user equipment profile information (e.g., via equipment profiles 290), display profile information (e.g., via equipment profile 290), and/or other relevant profile information. Profile information may be associated with particular instantiations (e.g., a sensor profile for a particular sensor 110 as indicated by a unique sensor identifier such as a serial number may provide information related to the particular sensor 110), related groups of elements (e.g., a user equipment profile for a type of helmet, an apparatus profile for a type or model of aircraft, etc.), and/or combined profile information (e.g., information related to a category of sensor, information related to a model and make of sensor, information related to a particular sensor, and/or other relevant delineations of information).

The process may include evaluating (at 1930) available templates. Such evaluation may include, for example, calculating a matching score or other metric for each available DIG template 265. Such a matching score may be calculated in various appropriate ways. For instance, each DIG template 265 may be associated with a listing of sensor inputs that may indicate, for example, sensor type, input type, input format, and/or other relevant attributes associated with the components of the DIG template 265. Data received from each sensor 110 may be analyzed to determine, for example, sensor type, output type, format, etc. In some cases, message headers or other metadata included with the sensor data may indicate such information. In some cases, the received data may be analyzed (e.g., using an AI model) to determine the attributes of the associated sensor 110 (e.g., the format, values, and/or other relevant information may indicate sensor type, output type, etc.).

Sensor data attributes for each sensor 110 may be compared to each of the DIG template 265 inputs to identify matching elements, or partially matching elements. For instance, if a particular DIG input indicates that the type of input is temperature and the format is three-digit decimal, sensor data indicating a temperature type and three-digit decimal output may be calculated to be a full or one hundred percent match for the particular DIG input. In some cases, variation in format or similar variations may be addressed in various ways. For instance, in the above example, a temperature sensor with a four-digit decimal output may be associated with a conversion or calculation and still be considered a one hundred percent match. As another example, a humidity sensor with a three-digit decimal output may be considered a zero percent match for the particular DIG input based solely on type and regardless of the other sensor parameters.

The matching scores for each DIG input may be averaged or combined in various ways to generate an overall matching score. For instance, each DIG input may be associated with a matching weight (e.g., via information associated with DIG template 265) and the input matching scores may be combined in a weighted average. Some DIG inputs may be associated with minimum matching thresholds or similar requirements. For instance, if location information is not available, a navigation DIG may generate a matching score of zero even if all other inputs are matched. In some embodiments, the matching score may be a ratio or percentage generated by dividing the number of inputs that match a sensor output by the total number of inputs.

As shown, process 1900 may include determining (at 1940) whether a matching template is available. Such a determination may be made in various appropriate ways depending on the criteria indicated by resources such as a set of selection rules 285. For instance, the matching score(s) calculated at 1930 may be sorted and the template associated with the highest matching score may be selected. In some embodiments, the highest matching score may be compared to a minimum matching threshold and may be selected as matching when the highest matching score meets or exceeds the minimum matching threshold (e.g., a minimum threshold of fifty percent match, seventy-file percent match, etc.).

In some cases, a template may be specified or indicated by the associated profile data and/or other data (e.g., a display may be dedicated to a specific DIG and the associated equipment profile 290 may indicate the DIG template to be used, regardless of calculated matching score). The template may be indicated by received information, such as content of a message received from sensors 110 (e.g., a message associated with a nine-line display may include header information indicating the type of message such that a nine-line DIG may be selected regardless of calculated matching score). As another example, DIG manager 100 may receive a user input indicating a DIG template to be used (e.g., via a menu or other resource associated with the DIG manager 100), where such a user input may be received via a default DIG template, "selection menu" DIG template, a request message, and/or other appropriate channels (e.g., via an API request).

If process 1900 determines (at 1940) that a matching template is available, the process may include selecting (at 1950) the template. The matching DIG template (e.g., DIG template 265) may be received from a resource such as storage 260 and provided to a resource such as the DIG generation controller 250.

If the process determines (at 1940) that a matching template is not available, process 1900 may include generating (at 1960) a template or selecting a default template (e.g., a text-based DIG). A template may be generated by identifying one or more matching elements and applying the matching elements to a footprint or layout. Template generation will be described in more detail in reference to process 2000 below.

As shown, process 1900 may include applying (at 1970) data to the template that was selected at 1950 or generated at 1960. Each dynamic DIG element may be associated with at least one input. DIG manager 100 may receive data from sensors 110 (and/or other components) and apply the received data to the template elements (e.g., by passing data to the dynamic element inputs). In addition, relevant profile information may be applied to the template. For instance, if a user profile 280 indicates that the current user prefers a particular set of display options for a DIG, the display options may be automatically applied to the DIG. As another example, an equipment profile 290 or apparatus profile 270 may specify a location for the DIG to be displayed (e.g., two-dimensional coordinates indicating the top left corner of a rectangular display, three-dimensional coordinates specifying a location for a VR or AR display, etc.).

In some cases, a DIG may include inputs such as labels, format, display type, etc. Data received from sensors 110 (e.g., message headers, radio signals, etc.) may indicate such information (e.g., a temperature sensor may include header information indicating that the label is "temperature") and/or be matched to appropriate elements (e.g., a temperature sensor may be matched to a temperature DIG element). Such data may at least partly control various DIG elements. For example, a temperature sensor may indicate whether readings are provided in Fahrenheit or Celsius. Various dynamic and/or static elements of the DIG may be associated with such data. Thus, applying (at 1970) data to the template may include providing such information to the DIG, such as by DIG controller 250 providing such information to a DIG template 265 when generating a DIG instantiation.

Process 1900 may include rendering (at 1980) the DIG and sending the DIG to the display (e.g., display 120). Rendering may include various processing operations, such as cropping, resizing, modifying color pallet, etc. Rendering output may depend on the capabilities of the display, as may be indicated by a resource such as equipment profile 290. For instance, a DIG having colored elements may be converted to black and white for a monochrome display. As another example, DIG size and/or resolution may be adjusted to match associated display capabilities. In some cases, the DIG may be rendered and sent to multiple displays (e.g., to wearable devices worn by each crew member on an aircraft) and/or types of displays (e.g., to a three-dimensional VR display and a flat panel display). "Rendering" as used in this disclosure may include any conversions or data formatting such that DIG information may be provided to a display or other appropriate resource (e.g., by providing a DIG instantiation as HTML, code, by converting image information to a streaming format, etc.).

Figure 20:
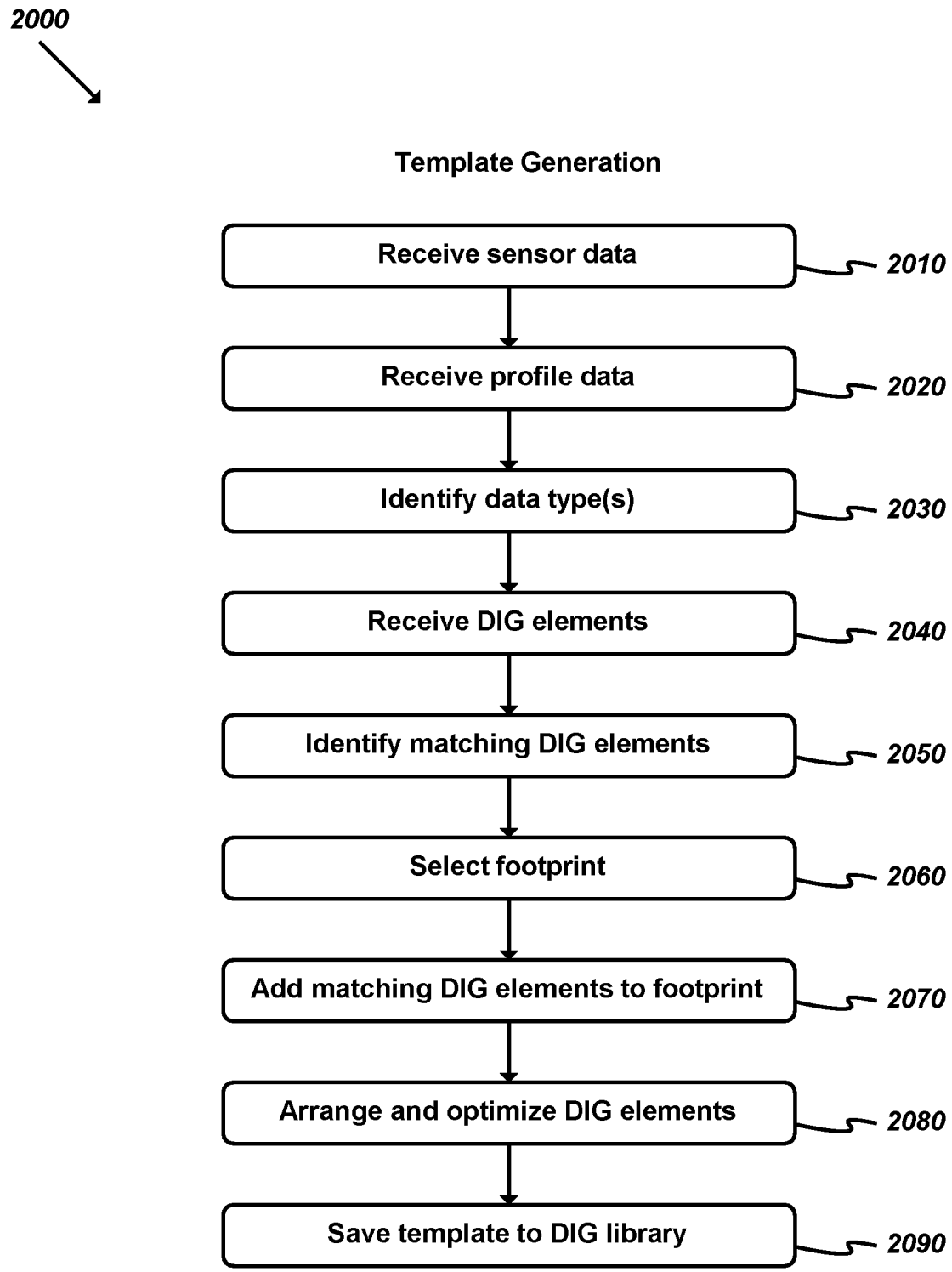
FIG. 20 illustrates a flow chart of an exemplary process that generates DIG templates.

FIG. 20 illustrates an example process 2000 for generating DIG templates. In some embodiments, a DIG template may be generated using a set of DIG elements and a DIG layout or footprint. The process may be performed when no matching DIG template is identified (e.g., when no DIG template achieves a matching score at or above a specified threshold). In some embodiments, process 2000 may be performed by DIG manager 100. Process 2000 may be performed using, or via, various AI resources such as intelligent agents and machine learning models.

As shown, process 2000 may include receiving (at 2010) sensor data. Sensor data may be received in a similar manner to operation 1910 described above.

Process 2000 may include receiving (at 2020) profile data. Profile data may be received in a similar manner to operation 1920 described above.

The process may include identifying (at 2030) data types associated with the received data. Such data types may be identified in various appropriate ways. For instance, the sensor 110 or other data source may provide information indicating the data type. As another example, received data may be analyzed using various AI models to identify the data type(s). Some data types may be associated with types, sub-types, and/or further delineations. For instance, a "position" type sensor may be associated with sub-types such as "accelerometer" or "gyroscope".

As shown, process 2000 may include receiving (at 2040) DIG elements. DIG elements may be received by DIG manager 100 via a resource such as storage 260. Each DIG element may indicate information such as size or shape, number of inputs, input type(s), supported format(s), etc. The DIG elements may be associated with one or more element libraries that may be associated with a listing of such elements that may be searched or otherwise analyzed to identify relevant DIG elements.

Process 2000 may include identifying (at 2050) matching DIG elements. Each DIG element may be matched to one or more sensor outputs from the received sensor data. Matching may include generation of matching scores, comparison to matching thresholds, and/or other analysis similar to that described above in reference to template matching. Such matching may include, for instance, matching by type, format, space required, etc. Matching of DIG elements may include mapping sensor outputs to discrete outputs and/or graphical representations. For instance, a sensor output may be mapped to discrete values (e.g., a sensor output may be associated with a threshold and mapped to "pass" if at or above the threshold and "fail" if below the threshold). As another example, a sensor output may provide discrete values, such as an integer from one to four, where each integer output may be mapped to a single display indicator (e.g., a circular indicator that displays colors green for one, yellow for two, orange for three, and red for four). Discrete display indicators may include or utilize, for instance, icons or other graphics, colors or fill patterns, and/or other appropriate indicators. DIG elements may include generic elements that may be applied to various types of sensor data when appropriate (e.g., no matching element is identified). Such elements may include inputs that may be used to indicate, for instance, data type, input range, format, display type, etc.).

The process may include selecting (at 2060) a footprint for the DIG template. A footprint may generally indicate a size and shape for the DIG template. DIG manager 100 may access a listing of footprints and/or may receive footprint information in a request message or similar communication from a resource such as a user equipment 330, user apparatus 340, and/or other appropriate resources. In some cases, display information may be received (e.g., via an equipment profile 290), and a footprint may be identified based on the capabilities of the display. Multiple footprints may be analyzed, and a selection may be based on a matching score or other metric, capabilities of the display, available sensor data, and/or other relevant factors.

As shown, process 2000 may include adding (at 2070) matching elements to the footprint. Elements may be added to the footprint based on various relevant factors (e.g., size, shape, type, default location, etc.).

Process 2000 may include arranging and optimizing (at 2080) the matching DIG elements. Similarly shaped or sized elements may be placed in rows or columns or otherwise aligned or arranged. In some cases, elements may have variable size and may be resized or reshaped to match other elements and/or available space. If additional space is available, additional matching elements may be identified or selected (e.g., the next elements below a cutoff threshold for a matching score may be selected until the space is filled) and/or element size may be increased to increase visibility. If the elements exceed the footprint, some elements may be reduced in size and/or the arrangement may be altered to accommodate the elements.

In some embodiments, inputs received from a user such as an administrative user may be used by process 2000 to generate or update templates. For instance, an administrative user may add additional DIG elements, rearrange the layout of elements, apply default settings and/or preferences, and/or otherwise modify the DIG templates.

The process may include saving (at 2090) the template to a DIG library. For instance, a DIG template 265 may be provided to storage 260 and/or other appropriate resources. In some embodiments, the DIG manager 100 may maintain one or more DIG libraries (e.g., via a file or data structure accessible via storage 260). Each DIG library may include a listing of DIG templates 265 associated with the DIG library. The listing may include relevant information related to each DIG template (e.g., unique identifier, type, input information, footprint, output type(s), etc.). In some cases, DIG libraries may be associated with specific groups of users (e.g., a crew, unit, or battalion), equipment, apparatus, sensors, etc., such as having different DIG libraries for each type of user, type of equipment, type of apparatus, type of sensor, etc.

Figure 21:
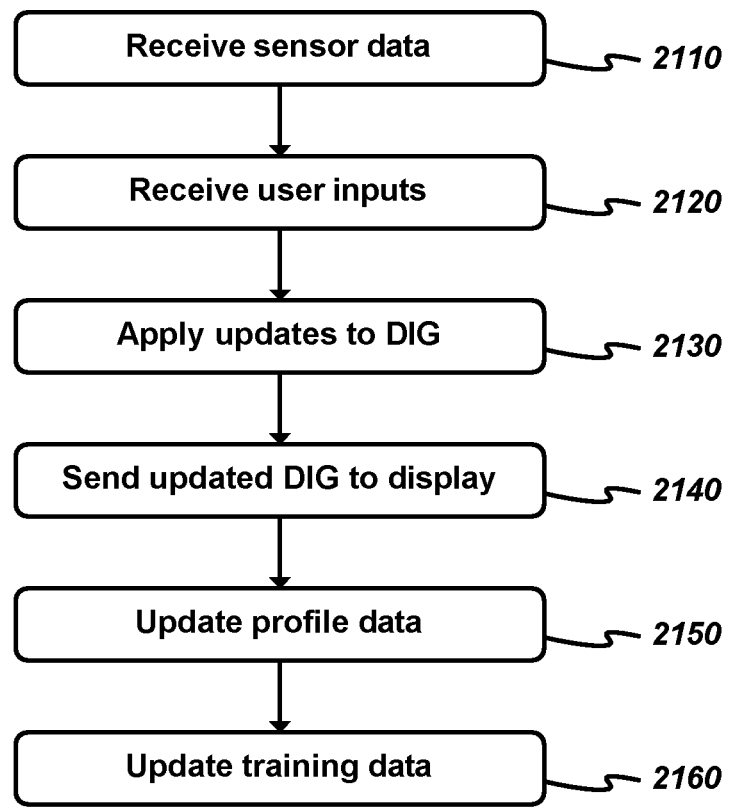
FIG. 21 illustrates a flow chart of an exemplary process that updates DIGs based on user interaction and received data.

FIG. 21 illustrates an example process 2100 for updating DIGs based on user interaction and received data. The process may update static or dynamic DIG elements, apply user inputs, and/or otherwise provide DIG updates (e.g., by repositioning or resizing the DIG). The process may be performed when a DIG is provided to a display by DIG manager 100. In some embodiments, process 2100 may be performed by DIG manager 100. Process 2100 may be performed using, or via, various AI resources such as intelligent agents and machine learning models.

As shown, process 2100 may include receiving (at 2110) sensor data. Sensor data may be received continuously, at regular or irregular intervals, and/or based on some specified criteria (e.g., an update is sent if a change threshold is met or exceeded).

Process 2100 may include receiving (at 2120) user inputs or feedback. User inputs may be received via various user interaction features (e.g., touchscreen, joystick, keyboard, voice, etc.). User inputs may include, for instance, selection or modification of DIG templates, DIG elements, display parameters, and/or other relevant attributes or parameters. For instance, a user selection of Fahrenheit temperatures instead of Celsius may be received via a DIG instantiation. As another example, a user selection of a DIG template may be received via a DIG menu element including a listing of available DIG templates. As still another example, a user may move DIG elements within a layout to generate a different arrangement.

The process may include applying (at 2130) updates to the DIG. Updates may be applied in various appropriate ways. For instance, if static elements such as labels are to be updated (e.g., a temperature label from "C" to "F"), the updated information may be provided to the DIG via a message or selection. As another example, for a dynamic or hybrid element, data may be provided via an array or matrix that includes information such as reading value(s), time of reading, etc. such that the data may be applied to the element. As another example, some sensor data may be mapped to discrete indicators or values and the discrete values may be provided to the DIG (e.g., a unique icon identifier, a text value such as "yes" or "no", etc.).

As shown, process 2100 may include sending (at 2140) an updated DIG to the display. The DIG may be rendered and sent in a similar manner to that described above in reference to operation 1980.

Process 2100 may include updating (at 2150) profile data. For instance, a user profile 280 may be updated based on inputs received from the associated user. As another example, an apparatus profile 270 may be updated based on inputs received from crew members of the associated apparatus. As still another example, a sensor profile may be updated based on received data and/or comparison to other sensor data (e.g., gain or offset associated with a sensor signal may be changed such that the sensor data more closely matches data received from other similar sensors).

The process may include updating (at 2160) training data, such as training data 275. Training data may include information related to, for instance, DIG template and/or element selection, DIG template generation, user selections, and/or other relevant data (e.g., whether a selection was made by an AI agent or a user, machine learning model used by the AI agent, etc.). Training data may be provided to a resource such as storage 260.

Figure 22:
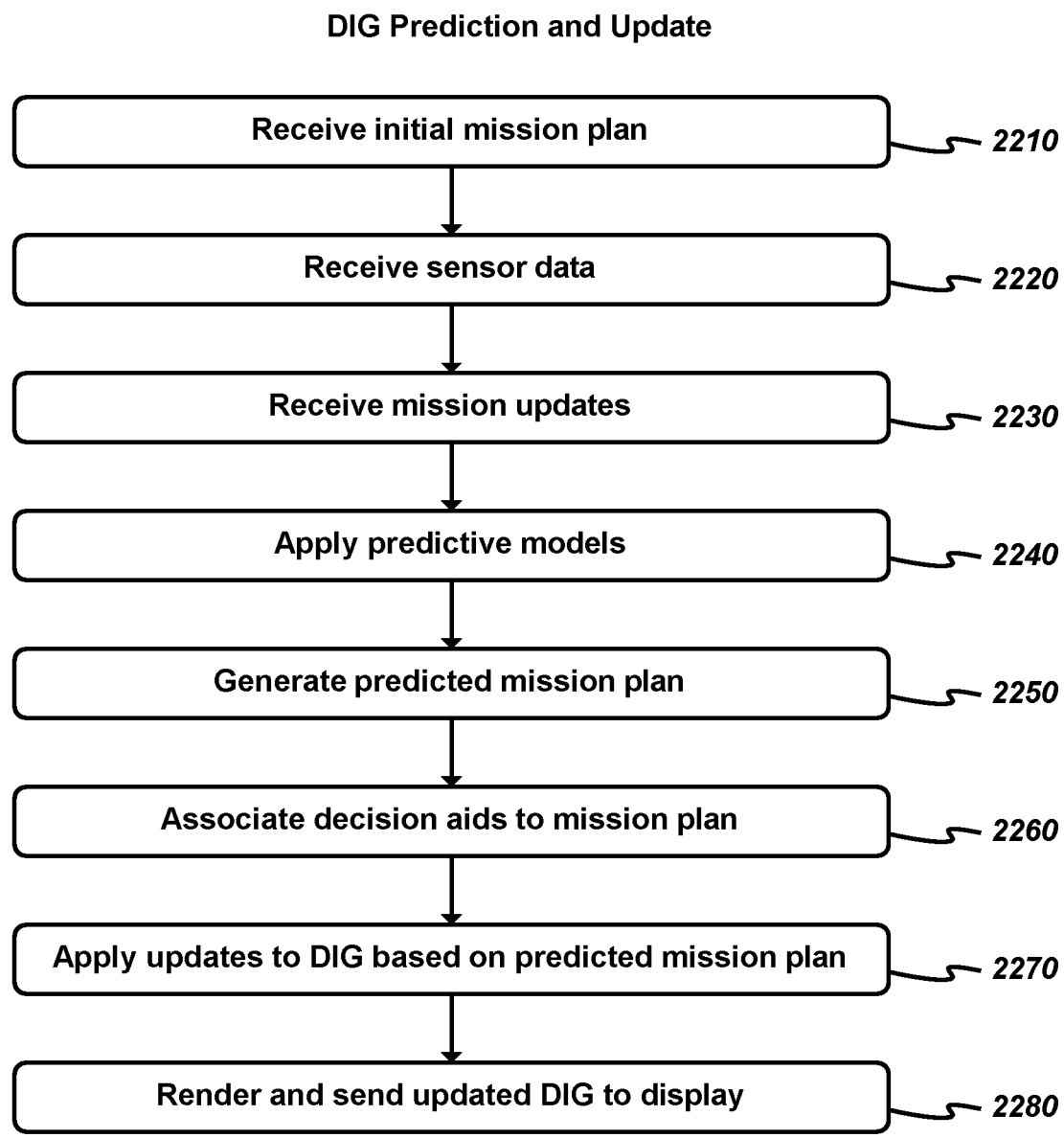
FIG. 22 illustrates a flow chart of an exemplary process that generates predictions and updates DIGs based on the predictions.

FIG. 22 illustrates an example process 2200 for generating predictions and updating DIGs based on the predictions. The process may be performed when a DIG is launched. In some embodiments, process 2200 may be performed by DIG manager 100.

As shown, process 2200 may include receiving (at 2210) an initial mission plan. Such a plan may be received from a resource such as storage 260 or server 350. The mission plan may include, for instance, one or more timelines, listings of resources (e.g., troops, aircraft, weapons, etc.), listings of targets or objectives, and/or other relevant and appropriate information. Different mission plans may be distributed to different parties or types of users. For instance, a commander may be able to access all information associated with the mission plan while a crew member may only be able to access a subset of information relevant and appropriate for the crew member. If no initial mission plan is available, a default plan or mode may be initiated (e.g., a destination or rendezvous point and time may be indicated without further instructions).

Process 2200 may include receiving (at 2220) sensor data. Sensor data may be received in a similar manner to that described above in reference to operation 1910. The process may receive information such as profile data, template data, and/or other relevant information.

The process may include receiving (at 2230) mission updates. Updates may be received from resources such as unmanned apparatus 320, user equipment 330, user apparatus 340, server 350, and/or other appropriate sources. Mission updates may include, for instance, location updates, updates regarding ongoing or completed objectives, updates regarding injuries or damages, and/or other relevant updates.

As shown, process 2200 may include applying (at 2240) predictive models. Intelligent agents may analyze sensor data (e.g., apparatus locations, troop health, supply status, communications, etc.) using various types of machine learning models. Predictive models may be applied at various levels of operation. For instance, predictive models applied at some user equipment may affect only DIGs provided via that user equipment. Other predictive models may be applied across various groups or hierarchies and may affect information provided by any number of DIG instantiations.

Process 2200 may include generating (at 2250) a predicted mission plan. Intelligent agents may be used to predict next actions, objectives, and/or other relevant mission information (e.g., flight paths, rendezvous points, etc.).

The process may include associating (at 2260) decision aids to the mission plan. Decision aids may include the "why" information described above. For instance, an action or objective may be indicated and the factor(s) resulting in the indication or selection may be provided, such as via panel 1110. Such transparency increases trust and promotes adherence to the mission plan and successful completion of the mission objectives. In some embodiments, only the most relevant factor may be provided. In some embodiments, a listing of relevant factors and information such as weighting or relevance to the selection or indication may be provided via the DIG.

As shown, process 2200 may include applying (at 2270) updates to the DIG based on the predicted mission plan. Updates, such as planned movements, targets, enemy location, etc. may be applied to a DIG such as DIG 1500. In addition, updates may be distributed to other relevant resources, such as radio transmitter 310, unmanned apparatus 320, user equipment 330, user apparatus 340, servers 350, and/or other appropriate components. Such updates may be received as sensor outputs by a process such as process 2100.

Process 2200 may include rendering and sending (at 2280) an updated DIG to the display. The DIG may be rendered and sent in a similar manner to that described above in reference to operation 1980.

Figure 23:
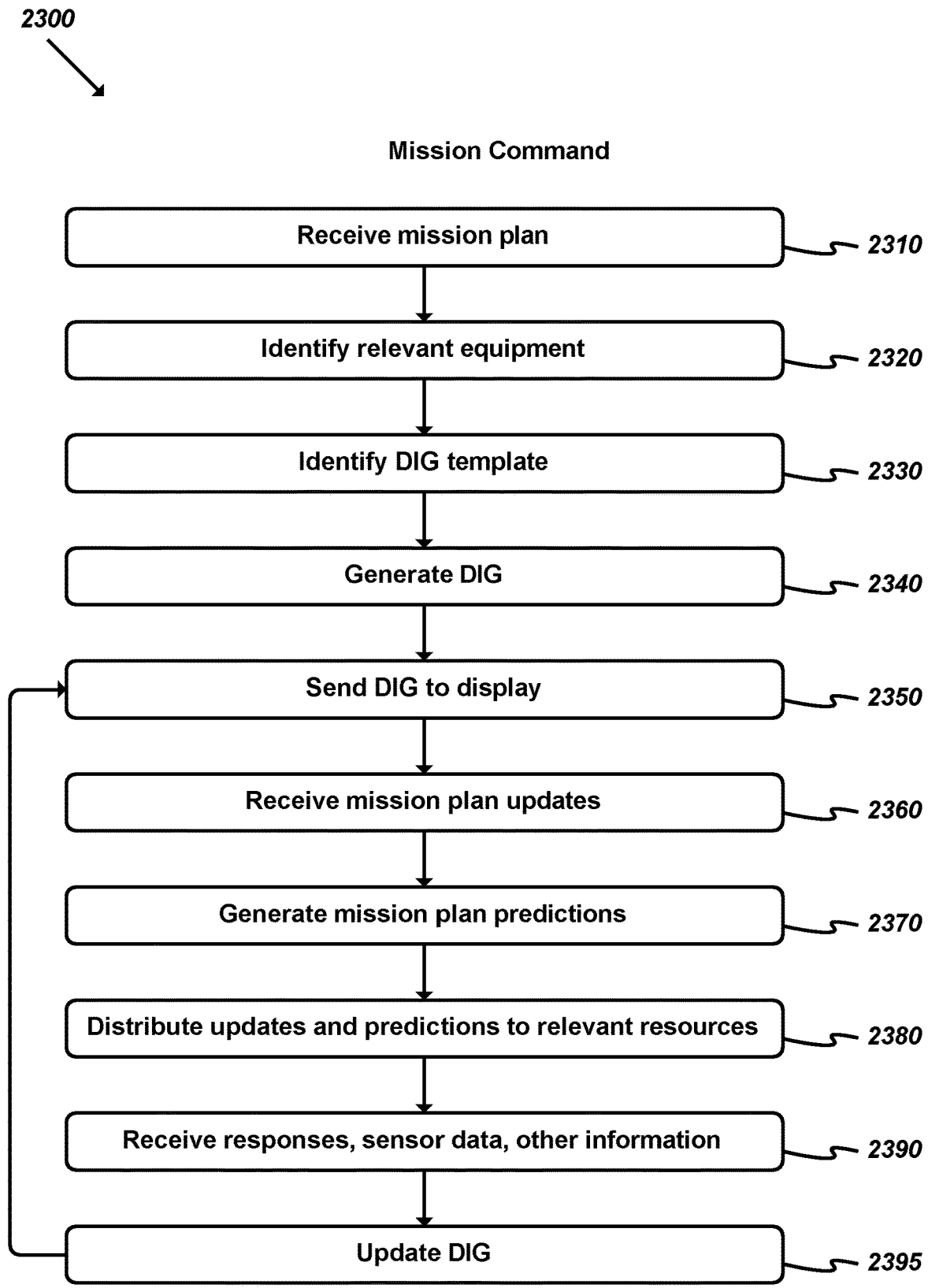
FIG. 23 illustrates a flow chart of an exemplary process that provides mission plan status and execution information and distributes mission plan updates.

FIG. 23 illustrates an example process 2300 for providing mission plan status and execution information and distributing mission plan updates. Such a process may be used to implement DIGs such as DIGs 1500-1800 associated with SESU operations. The process may be performed when a commander or planning DIG is launched. The process may be performed when a DIG is launched. In some embodiments, process 2300 may be performed by DIG manager 100.

As shown, process 2300 may include receiving (at 2310) a mission plan. The mission plan may be received in a similar manner to operation 2210 described above. The mission commander may have access to all mission plan data and/or sub-plans, such as those to be distributed to various crew members, types of resources, etc.

Process 2300 may include identifying (at 2320) relevant equipment. The mission plan may be associated with a listing of equipment and/or other resources (e.g., troops) that may be associated with a mission. The listing of equipment and resources may include a listing of, for instance, equipment identifiers, apparatus identifiers, user identifiers, etc. that may be used to identify various associated profiles and/or other relevant information.

The process may include identifying (at 2330) a DIG template. The DIG template may be identified based on various relevant criteria, such as matching score, user preferences, display attributes, etc.

As shown, process 2300 may include generating (at 2340) a DIG. The DIG may be generated in a similar manner to that described above in reference to process 1900.

Process 2300 may include sending (at 2350) the DIG to a display. The DIG may be rendered and sent to the display in a similar manner to that described above in reference to operation 1980.

The process may include receiving (at 2360) mission plan updates. Mission plan updates may be received from a resource such as server 350. Mission plan updates may include updated objectives or actions. Such updates may be generated based on intelligent agent analysis, command inputs, sensor data, and/or other relevant information.

As shown, process 2300 may include generating (at 2370) mission plan predictions. Predictions may be generated using various intelligent agents and/or other relevant and appropriate information (e.g., commander inputs).

Process 2300 may include distributing (at 2380) updates and predictions to relevant resources. Information may be distributed according to various relevant criteria, as may be indicated by elements such as user profiles 280, apparatus profiles 270, equipment profiles 290, selection rules 285, etc.

The process may include receiving (at 2390) responses, sensor data, and/or other information from the relevant resources. Such information may include, for instance, location updates, communications regarding objectives, weather or visibility information, etc. Such information may include commander indications, selections, and/or other feedback.

As shown, process 2300 may include updating (at 2395) the DIG. The DIG may be updated by rendering the updated DIG and sending the rendered DIG to the display.

Operations 2350-2395 may be performed iteratively, while the DIG is active.

Figure 24:
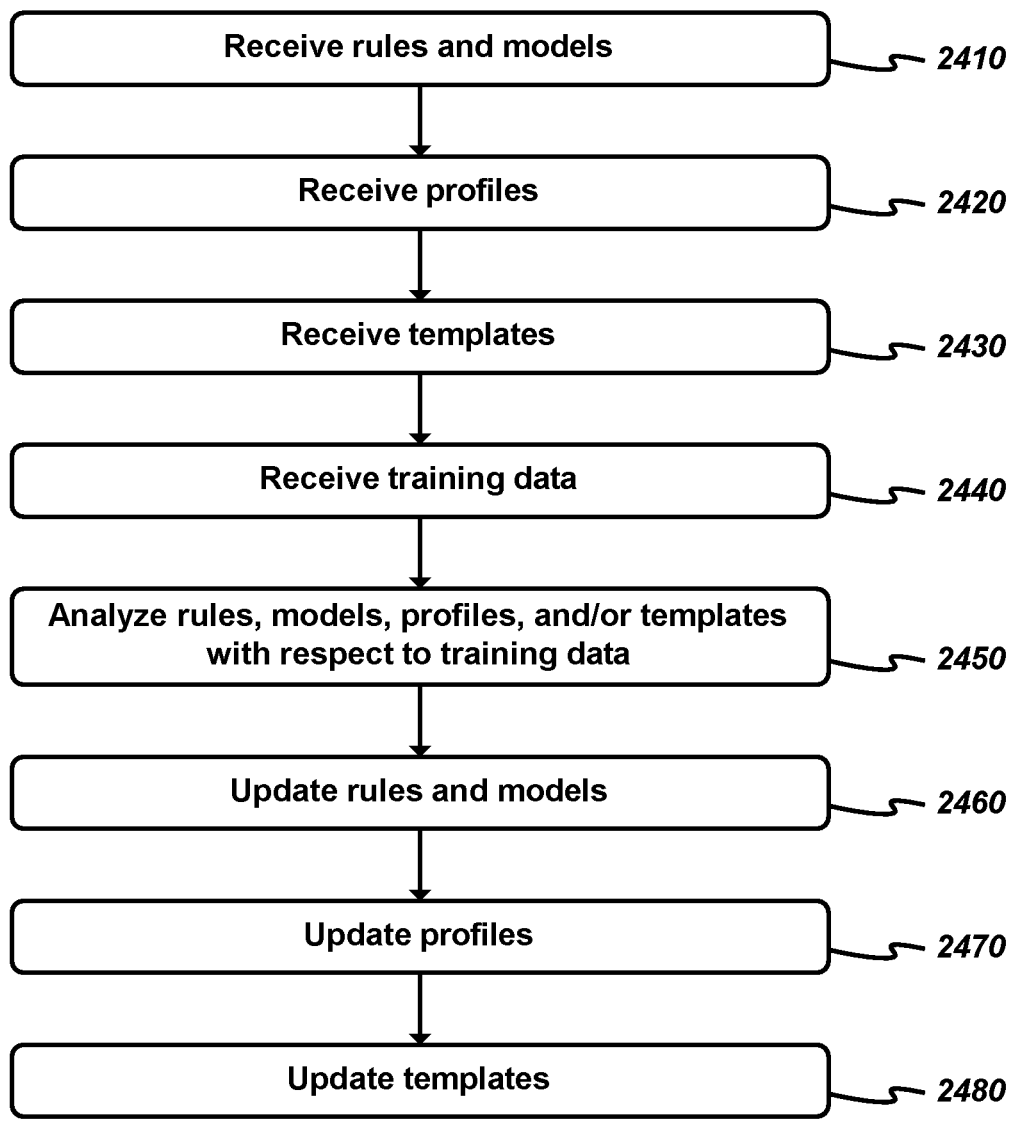
FIG. 24 illustrates a flow chart of an exemplary process that applies machine learning to DIG generation and provision.

FIG. 24 illustrates an example process 2400 for applying machine learning to DIG generation and provision. The process may be performed when training data is available. In some embodiments, process 2400 may be performed by DIG manager 100.

As shown, process 2400 may include receiving (at 2410) rules and models. Rules and models (e.g., selection rules 285) may be received from a resource such as storage 260 or server 350. Rules and models may include information associated with AI resources, DIG manager features and operation, DIG deployment, and/or user interaction via DIG.

Process 2400 may include receiving (at 2420) profiles. Profiles such as apparatus profiles 270, user profiles 280, and equipment profiles 290 may be received via a resource such as storage 260.

The process may include receiving (at 2430) templates. Templates such as DIG templates 265 may be received via a resource such as storage 260.

As shown, process 2400 may include receiving (at 2440) training data. Training data, such as training data 275 may be received via a resource such as storage 260. Training data may include, for example, administrator feedback, user selection information, usage information, and/or other relevant information related to DIG performance.

Process 2400 may include analyzing (at 2450) the rules, models, profiles, and/or templates with respect to the training data. Such analysis may be performed using various AI agents, tools, models, and/or other resources.

The process may include updating (at 2460) rules and models based on the analysis. For example, if a first DIG is selected using a rule or model and users often manually change to a second DIG, the rules or models may be updated to be more likely to recommend or select the second DIG in the future. Such updated rules and models may be saved to a resource such as storage 260.

As shown, process 2400 may include updating (at 2470) profiles based on the analysis. For instance, if a particular user has changed habits over time and now shows a preference for different DIG attributes, a user profile 280 associated with the user may be updated to indicate the different DIG attributes, which may be selected by default in the future. Such updated profiles may be saved to a resource such as storage 260.

Process 2400 may include updating (at 2480) templates based on the analysis. For instance, if many administrators add a DIG element to a first type of template (e.g., a weather template), such an element may also be added to other templates.

In some cases, users such as administrators may be able to override, modify, or otherwise manage updates to the various elements. For instance, machine learning updates may be provided to such a user for review and approval.

One of ordinary skill in the art will recognize that processes 1900-2400 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel. As still another example, although various processes may have been described by reference to specific resources (e.g., DIG manager 100), such processes may be performed, alone or in combination, by various other system or environment resources, such as sensor 110, radio transmitter 310, unmanned apparatus 320, user equipment 330, user apparatus 340, server 350, and/or other appropriate resources.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 25:
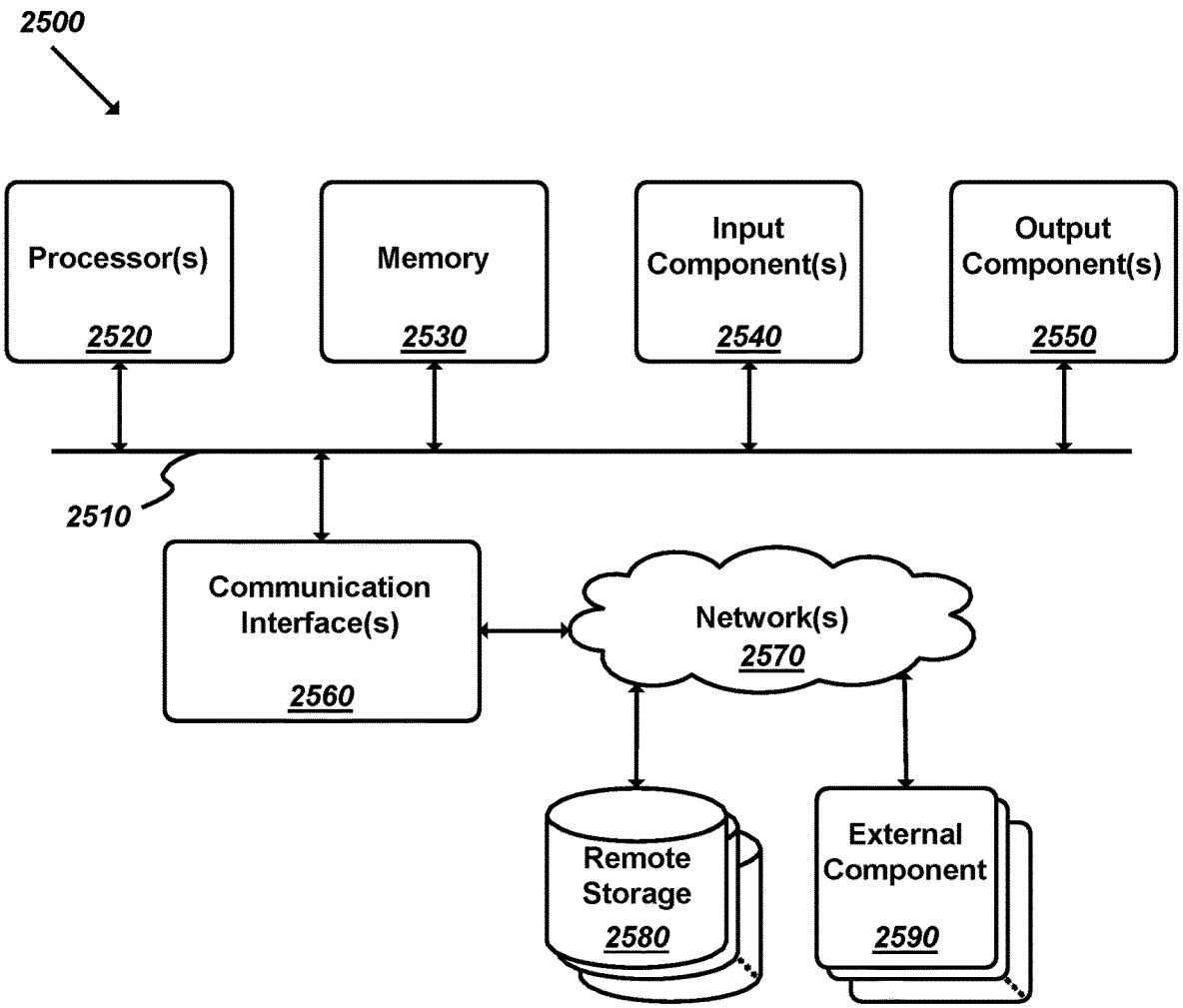
FIG. 25 illustrates a schematic block diagram of one or more exemplary devices used to implement various embodiments.

FIG. 25 illustrates a schematic block diagram of an exemplary device (or system or devices) 2500 used to implement some embodiments. For example, the devices, systems, components, and/or environment described above in reference to FIG. 1, FIG. 2, and FIG. 3 may be at least partially implemented using device 2500. As still another example, the processes described in reference to FIG. 19, FIG. 20, FIG. 21, FIG. 22, FIG. 23, and FIG. 24 may be at least partially implemented using device 2500.

Device 2500 may be implemented using various appropriate elements and/or sub-devices. For instance, device 2500 may be implemented using one or more personal computers (PCs), servers, mobile devices (e.g., smartphones), tablet devices, wearable devices, and/or any other appropriate devices. The various devices may work alone (e.g., device 2500 may be implemented as a single smartphone) or in conjunction (e.g., some components of the device 2500 may be provided by a mobile device while other components are provided by a server).

As shown, device 2500 may include at least one communication bus 2510, one or more processors 2520, memory 2530, input components 2540, output components 2550, and one or more communication interfaces 2560.

Bus 2510 may include various communication pathways that allow communication among the components of device 2500. Processor 2520 may include a processor, microprocessor, microcontroller, digital signal processor, logic circuitry, and/or other appropriate processing components that may be able to interpret and execute instructions and/or otherwise manipulate data. Memory 2530 may include dynamic and/or non-volatile memory structures and/or devices that may store data and/or instructions for use by other components of device 2500. Such a memory device 2530 may include space within a single physical memory device or spread across multiple physical memory devices.

Input components 2540 may include elements that allow a user to communicate information to the computer system and/or manipulate various operations of the system. The input components may include keyboards, cursor control devices, audio input devices and/or video input devices, touchscreens, motion sensors, etc. Output components 2550 may include displays, touchscreens, audio elements such as speakers, indicators such as light-emitting diodes (LEDs), printers, haptic or other sensory elements, etc. Some or all of the input and/or output components may be wirelessly or optically connected to the device 2500.

Device 2500 may include one or more communication interfaces 2560 that are able to connect to one or more networks 2570 or other communication pathways. For example, device 2500 may be coupled to a web server on the Internet such that a web browser executing on device 2500 may interact with the web server as a user interacts with an interface that operates in the web browser. Device 2500 may be able to access one or more remote storages 2580 and one or more external components 2590 through the communication interface 2560 and network 2570. The communication interface(s) 2560 may include one or more application programming interfaces (APIs) that may allow the device 2500 to access remote systems and/or storages and also may allow remote systems and/or storages to access device 2500 (or elements thereof).

It should be recognized by one of ordinary skill in the art that any or all of the components of computer system 2500 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 2500 may perform various operations in response to processor 2520 executing software instructions stored in a computer-readable medium, such as memory 2530. Such operations may include manipulations of the output components 2550 (e.g., display of information, haptic feedback, audio outputs, etc.), communication interface 2560 (e.g., establishing a communication channel with another device or component, sending and/or receiving sets of messages, etc.), and/or other components of device 2500.

The software instructions may be read into memory 2530 from another computer-readable medium or from another device. The software instructions stored in memory 2530 may cause processor 2520 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device, comprising:
one or more processors configured to:
receive continuously updated sensor data collected and processed by an intelligent agent (IA) using artificial intelligence from a plurality of sensors within an Internet of Battlefield Things (IoBT) set of sensors;
receive a listing of available display templates based on known and learned template information, association and effects;
generate a matching score for each display template in the listing of available display templates;
select a matching display template based at least partly on the matching score or on machine learning; and
generate a dynamic user interface (UI) by providing the sensor data to the display template, wherein the sensor data is provided without user input.

2. The device of claim 1, the one or more processors further configured to:
receive updated sensor data from at least one sensor from the plurality of sensors within the IoBT set of sensors;
receive user feedback;
learn through machine learning and integrate new information, associations, effects and trends based on novel and previous experience; and
update the dynamic UI by providing the updated sensor data and the received user feedback to the display template without user input.

3. The device of claim 1, wherein generating a matching score for each display template comprises:
the IA identifying a set of inputs for each display template in the listing of available display templates; and
determining whether at least one input from the set of inputs is a same type as at least one output of the plurality of sensors within the IoBT set of sensors.

4. The device of claim 3, wherein the IA generating a matching score for each display template further comprises calculating the matching score by dividing a quantity of inputs from the set of inputs having a same type as at least one output of the plurality of sensors by a quantity of inputs in the set of inputs.

5. The device of claim 1, the one or more processors further configured to:
generate at least one explanation using eXplainable AI (XAI) principles for each action, decision or recommendation made by the IA;
generate at least one prediction based at least partly on the received sensor data and the matching display template; and
update the dynamic UI by providing the at least one prediction to the display template, wherein the at least one prediction is associated with calculated or otherwise determined information.

6. The device of claim 5, the one or more processors further configured to:
identify at least one relevant factor in generating at least one explanation for each action, decision, or recommendation made by the IA, and the at least one prediction based on trends identified by the IA; and
update the dynamic UI by providing the at least one relevant factor to the display template.

7. The device of claim 1, the one or more processors further configured to:
render the dynamic UI; and
send the rendered dynamic UI to a display without user input.

8. A non-transitory computer-readable medium, storing a plurality of processor executable instructions to:
receive continuously updated sensor data collected and processed by an intelligent agent (IA) using artificial intelligence from a plurality of sensors within an Internet Battlefield Things (IoBT) set of sensors;
receive a listing of available display templates based on known and learned template information, association and effects;
generate a matching score for each display template in the listing of available display templates;
select a matching display template based at least partly on the matching score or on machine learning; and
generate a dynamic user interface (UI) by providing the sensor data to the display template, wherein the sensor data is provided without user input.

9. The non-transitory computer-readable medium of claim 8, the plurality of processor executable instructions further to:
receive updated sensor data from at least one sensor from the plurality of sensors within the IoBT set of sensors;
receive user feedback;
learn through machine learning and integrate new information, associations, effects and trends based on novel and previous experience; and
update the dynamic UI by providing the updated sensor data and the received user feedback to the display template without user input.

10. The non-transitory computer-readable medium of claim 8, wherein generating a matching score for each display template comprises:
the IA identifying a set of inputs for each display template in the listing of available display templates; and
determining whether at least one input from the set of inputs is a same type as at least one output of the plurality of sensors within the IoBT set of sensors.

11. The non-transitory computer-readable medium of claim 10, wherein the IA generating a matching score for each display template further comprises calculating the matching score by dividing a quantity of inputs from the set of inputs having a same type as at least one output of the plurality of sensors by a quantity of inputs in the set of inputs.

12. The non-transitory computer-readable medium of claim 8, the plurality of processor executable instructions further to:

generate at least one explanation using eXplainable AI (XAI) principles for each action, decision or recommendation made by the IA;

generate at least one prediction based at least partly on the received sensor data and the matching display template; and update the dynamic UI by providing the at least one prediction to the display template, wherein the at least one prediction is associated with calculated or otherwise determined information.

13. The non-transitory computer-readable medium of claim 12, the plurality of processor executable instructions further to:

identify at least one relevant factor in generating at least one explanation for each action, decision, or recommendation made by the IA, and the at least one prediction based on trends identified by the IA; and update the dynamic UI by providing the at least one relevant factor to the display template.

14. The non-transitory computer-readable medium of claim 8, the plurality of processor executable instructions further to:

render the dynamic UI; and send the rendered dynamic UI to a display without user input.

15. A method comprising:

receiving continuously updated sensor data collected and processed by an intelligent agent (IA) using artificial intelligence from a plurality of sensors;

receiving a listing of available display templates based on known and learned template information, association and effects;

generating a matching score for each display template in the listing of available display templates;

selecting a matching display template based at least partly on the matching score or on machine learning; and generating a dynamic user interface (UI) by providing the sensor data to the display template, wherein the sensor data is provided without user input.

16. The method of claim 15 further comprising:

receiving updated sensor data from at least one sensor from the plurality of sensors within the IoBT set of sensors;

receiving user feedback;

learn through machine learning and integrate new information, associations, effects and trends based on novel and previous experience; and updating the dynamic UI by providing the updated sensor data and the received user feedback to the display template without user input.

17. The method of claim 15, wherein generating a matching score for each display template comprises:

the IA identifying a set of inputs for each display template in the listing of available display templates; and determining whether at least one input from the set of inputs is a same type as at least one output of the plurality of sensors within the IoBT set of sensors.

18. The method of claim 17, wherein the IA generating a matching score for each display template further comprises calculating the matching score by dividing a quantity of inputs from the set of inputs having a same type as at least one output of the plurality of sensors by a quantity of inputs in the set of inputs.

19. The method of claim 15 further comprising:

generating at least one explanation using eXplainable AI (XAI) principles for each action, decision or recommendation made by the IA;

generating at least one prediction based at least partly on the received sensor data and the matching display template;

updating the dynamic UI by providing the at least one prediction to the display template, wherein the at least one prediction is associated with calculated or otherwise determined information;

identifying at least one relevant factor in generating at least one explanation for each action, decision, or recommendation made by the IA, and the at least one prediction based on trends identified by the IA; and updating the dynamic UI by providing the at least one relevant factor to the display template.

20. The method of claim 15 further comprising:

rendering the dynamic UI; and sending the rendered dynamic UI to a display without user input.

* * * * *